(12) United States Patent
Ishii et al.

(10) Patent No.: US 9,035,491 B2
(45) Date of Patent: May 19, 2015

(54) VOLTAGE SETTING DEVICE, PHOTOVOLTAIC POWER GENERATION SYSTEM, AND CONTROL METHOD OF VOLTAGE SETTING DEVICE

(75) Inventors: Takanori Ishii, Uji (JP); Akira Enami, Ashiya (JP); Takuya Nakai, Kyoto (JP); Akihiro Funamoto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 527 days.

(21) Appl. No.: 13/500,166

(22) PCT Filed: Nov. 12, 2010

(86) PCT No.: PCT/JP2010/070221
§ 371 (c)(1),
(2), (4) Date: Jun. 11, 2012

(87) PCT Pub. No.: WO2011/059067
PCT Pub. Date: May 19, 2011

(65) Prior Publication Data
US 2012/0242303 A1    Sep. 27, 2012

(30) Foreign Application Priority Data

Nov. 16, 2009  (JP) .................................. 2009-261175
Jun. 18, 2010  (JP) .................................. 2010-139483
Nov. 5, 2010   (JP) .................................. 2010-248103

(51) Int. Cl.
*H02J 1/10* (2006.01)
*G05F 1/67* (2006.01)
*H02J 3/38* (2006.01)

(52) U.S. Cl.
CPC ... *G05F 1/67* (2013.01); *H02J 1/10* (2013.01); *H02J 3/383* (2013.01); *H02J 3/385* (2013.01); *Y02E 10/563* (2013.01); *Y02E 10/58* (2013.01)

(58) Field of Classification Search
CPC .......................................................... H02J 1/10
USPC .............................................. 307/23, 80, 151
See application file for complete search history.

(56) References Cited

U.S. PATENT DOCUMENTS

| 5,682,305 A | 10/1997 | Kurokami et al. |
| 2008/0164766 A1* | 7/2008 | Adest et al. ..................... 307/80 |
| 2009/0150005 A1 | 6/2009 | Hadar et al. |

FOREIGN PATENT DOCUMENTS

| JP | 62-154122 A | 7/1987 |
| JP | 5-250053 A  | 9/1993 |

(Continued)

OTHER PUBLICATIONS

Japan Office action for related JP Application No. 2009-261175, mail date is Dec. 22, 2009.

(Continued)

*Primary Examiner* — Hal Kaplan
(74) *Attorney, Agent, or Firm* — Greenblum & Bernstein, P.L.C.

(57) ABSTRACT

An output converter includes a DCDC conversion section, a secondary side voltage/current monitoring section detecting a power from the DCDC conversion section, a maximum operation point control section determining what voltage is to be set by the DCDC conversion section so that the power detected by the secondary side voltage/current monitoring section is maximum, a DCDC short-circuit switch via which a current from a module bypasses the DCDC conversion section to outside, a primary side voltage/current monitoring section measuring the current from the module, a module short-circuit switch switching between a state where a secondary side cathode and a secondary side anode are short-circuited and a state where they are not short-circuited, the maximum operation point control section causing the DCDC short-circuit switch and the module short-circuit switch to switch.

15 Claims, 11 Drawing Sheets

(56) References Cited

FOREIGN PATENT DOCUMENTS

| | | |
|---|---|---|
| JP | 07-020607 | 4/1995 |
| JP | 7-191767 A | 7/1995 |
| JP | 11-46457 A | 2/1999 |
| JP | 2000-112545 A | 4/2000 |
| JP | 2000-181555 A | 6/2000 |
| JP | 2001-178145 A | 6/2001 |
| JP | 2002-108466 A | 4/2002 |
| JP | 2002-238246 A | 8/2002 |
| JP | 2007-058845 A | 3/2007 |
| WO | 2006/033142 | 3/2006 |
| WO | 2006/075371 | 7/2006 |

OTHER PUBLICATIONS

Japan Office action for related JP Application No. 2009-261175, mail date is Apr. 20, 2010.

* cited by examiner

FIG. 3

| OUTPUT FROM MODULE | LOSS AT OUTPUT CONVERTER | OUTPUT FROM SECONDARY SIDE OF OUTPUT CONVERTER |
|---|---|---|
| 10 | 4 | 6 |
| 9 | 2 | 7 |
| 8 | 3 | 5 |

RELATED ART

VOLTAGE SETTING DEVICE, PHOTOVOLTAIC POWER GENERATION SYSTEM, AND CONTROL METHOD OF VOLTAGE SETTING DEVICE

TECHNICAL FIELD

The present invention relates to a voltage setting device for carrying out DCDC conversion (direct current voltage conversion), a photovoltaic power generation system, and a method for controlling the voltage setting device.

BACKGROUND ART

Recently, a photovoltaic power generation using solar energy which is limitless, environment-friendly, and clean has been attracting much attention.

With reference to FIG. 12, the following explains components of a solar battery used in a photovoltaic power generation system.

As shown in FIG. 12, a solar cell SEL1000 which generates, by the photovoltaic effect, an electric current upon irradiation with sunlight is the minimum unit of a solar battery.

A solar battery module MOD1011 is a unit consisting of a plurality of solar cells SEL1000.

A solar battery string STR1001 consists of a plurality of solar battery modules MOD1011 connected in series.

A solar battery array ARR1010 consists of a plurality of solar battery strings STR1001 connected in parallel.

Next, with reference to FIG. 13, the following schematically explains a typical configuration of a photovoltaic power generation system for carrying out photovoltaic power generation.

As shown in FIG. 13, a photovoltaic power generation system 1001 includes the solar battery array ARR1010, a power conditioner 1020, and a load 1030.

The power conditioner 1020 converts a direct current power from the solar battery array ARR1010 into an alternating current power by a built-in inverter 1021 and supplies the alternating current power to the load 1030.

The photovoltaic power generation system 1001 may be configured to operate in connection with a commercial power line 1040 provided by an electric power company as shown in FIG. 13, or may be configured to operate independently of the power line 1040 provided by an electric power company.

Conventionally, in such a photovoltaic power generation system, there has been requested a more efficient conversion from solar energy to a power. In order to meet such a request, various techniques have been proposed. Four examples of such techniques are described below.

Initially, there has been proposed a technique for operating each string of solar batteries at its maximum power point (Patent Literature 1).

Furthermore, there has been proposed that each PV module (panel) is provided with a communication device for communicating with a management unit, the communication device transmits the operation state of the PV module to the management unit, and the management unit transmits to the communication device a control signal which instructs the PV module to operate at the maximum output (Patent Literature 2).

Patent Literature 3 discloses a technique in which even if a part of a photovoltaic power generation system is under different sunshine conditions, is positioned in different directions, and/or is put under different temperature conditions, switching control is made in each PV module to adjust an operating voltage/current, thereby more efficiently obtaining a power.

Lastly, Patent Literature 4 discloses that various parameters at the time when a power from a solar battery reached the maximum power point as a result of changing an operating voltage of an inverter are stored in a database, and in a normal operation, the operating voltage is adjusted based on the parameters stored in the database.

CITATION LIST

Patent Literatures

[Patent Literature 1]
International Publication No. 2006/033142(A1), specification (published on Mar. 30, 2006)
[Patent Literature 2]
US Patent Application Publication No. 2009/0150005, specification (published on Jun. 11, 2009)
[Patent Literature 3]
Japanese Patent Application Publication No. 2007-58845 (Mar. 8, 2007)
[Patent Literature 4]
Japanese Patent Application Publication No. 2000-181555 (Jun. 30, 2000)

SUMMARY OF INVENTION

Technical Problem

However, the above conventional techniques suffer a problem that even if the maximum power can be obtained from each PV module, DCDC conversion may greatly reduce output power, so that a photovoltaic power generation system as a whole cannot necessarily obtain the maximum power.

The present invention was made in view of the foregoing problem. An object of the present invention is to realize a voltage setting device, a control management device, a photovoltaic power generation system, and a method for controlling the voltage setting device, each capable of subduing a loss when outputting a power from a voltage changing circuit capable of changing a voltage (so-called loss at DCDC conversion).

Solution to Problem

In order to solve the foregoing problem, a voltage setting device of the present invention is a voltage setting device for setting a voltage to a current from a solar battery and outputting the current at the voltage to outside, including: a voltage changing circuit capable of changing the voltage; output power detection means for detecting a power from the voltage changing circuit; voltage determination means for determining what voltage is to be set by the voltage changing circuit so that an output power detected by the output power detection means is maximum; a bypass circuit via which the current from the solar battery bypasses the voltage changing circuit to be outputted to outside; bypass determination means for determining whether the current from the solar battery is to be outputted to outside via the voltage changing circuit or via the bypass circuit; power measurement means for measuring a power from the solar battery; a short-circuit switching circuit for switching between a state where a cathode output terminal for outputting a voltage to outside and an anode output terminal are short-circuited and a state where the cathode output terminal and the anode output terminal are not short-circuited; and short-circuit determination means for, when the power measured by the power measurement means is not more than a predetermined value, switching the short-circuit switching circuit to the state where the cathode output terminal and the anode output terminal are short-circuited.

In order to solve the foregoing problem, a method of the present invention for controlling a voltage setting device is a method for controlling a voltage setting device for setting a voltage to a current from a solar battery and outputting the current at the voltage to outside, including the steps of: (i) detecting a power from a voltage changing circuit capable of changing the voltage; (ii) determining what voltage is to be set by the voltage changing circuit so that an output power detected in the step (i) is maximum; (iii) determining whether the current from the solar battery is to be outputted to outside via the voltage changing circuit or via a bypass circuit via which the current from the solar battery bypasses the voltage changing circuit to be outputted to outside; (iv) measuring a power from the solar battery; and (v) when the power measured in the step (iv) is not more than a predetermined value, switching a short-circuit switching circuit from a state where a cathode output terminal for outputting a voltage to outside and an anode output terminal are not short-circuited to a state where the cathode output terminal and the anode output terminal are short-circuited.

With the arrangement, it is possible to detect a power from the power changing circuit when a direct current voltage from the solar battery is inputted to the power changing circuit and outputted therefrom. The solar battery may be a cell which is a photovoltaic power generation element, may be a cluster or a module in which a plurality of cells are connected in series, may be a string in which a plurality of modules are connected in series, or may be an array in which a plurality of strings are connected in parallel.

While detecting the power from the voltage changing circuit, there is determined what voltage is to be set by the voltage changing circuit so that the detected power is maximum.

Accordingly, it is possible to subdue a loss when a voltage is set by the voltage changing circuit and a current at the voltage is outputted to outside (so-called DCDC conversion). Consequently, it is possible to obtain the maximum output power from the voltage changing circuit which power could not be obtained only by maximizing the output from the solar battery. In other words, with the arrangement, it is possible to efficiently use solar energy.

There is a loss in power when a voltage is set by the voltage changing circuit to a current from the solar battery and the current at the set voltage is outputted to outside.

With the arrangement, there is provided the bypass circuit via which a current bypasses the voltage changing circuit to be outputted to outside, and it is possible to determine whether the current from the solar battery is to be outputted to outside via the voltage changing circuit or via the bypass circuit.

Accordingly, it is possible to output a current to outside via the bypass circuit if necessary.

As described above, by outputting a current to outside via the bypass circuit if necessary, it is possible to prevent a loss in power at the voltage changing circuit.

Furthermore, as described above, in a case where a sufficiently large power is obtained from the solar battery without changing a voltage, it is more preferable that a current is outputted to outside via the bypass circuit in order to prevent a loss in power at the voltage changing circuit.

With the arrangement, initially, the power from the solar battery is measured, so that it is possible to determine, based on the measured power, whether the current is to be outputted to outside via the voltage changing circuit or via the bypass circuit.

Accordingly, it is possible to determine whether the current is to be outputted via the voltage changing circuit or via the bypass circuit depending on whether a sufficiently large power is being obtained from the solar battery or not.

Consequently, it is possible to prevent a loss in power caused when a sufficiently large power from the solar battery is outputted via the voltage changing circuit.

In a case where voltage setting devices connected with solar batteries are connected in series with each other, decrease in output power of one solar battery may greatly decrease output power of other solar battery.

With the arrangement, a power from the solar battery is measured and the state of the short-circuit switching circuit is changed based on the measured power. Accordingly, when the output of the solar battery decreases, it is possible to bypass the solar battery in the circuit configuration so that a current from one voltage setting device of the voltage setting devices connected in series is directly outputted to the other voltage setting device. Consequently, it is possible to eliminate, from the circuit configuration, the solar battery that may have an adverse influence on the power from other solar batteries as a whole.

Accordingly, it is possible to prevent the solar battery with decreased output from having an adverse influence on the power from other solar batteries as a whole.

Furthermore, a current flowing in a short-circuit condition flows in a single direction due to a backflow preventing function. Accordingly, a backflow prevention element normally included in a connection box is unnecessary.

In order to solve the foregoing problem, a voltage setting device of the present invention is a voltage setting device which is connected with one of a plurality of solar batteries included in a solar battery array, which sets a voltage to a current from said one solar battery, and which outputs the current at the voltage to outside, the voltage setting device being communicably connected with a control management device for generating array output power data indicative of a sum of powers outputted from the plurality of solar batteries included in the solar battery array, the voltage setting device including: a voltage changing circuit capable of changing the voltage; output power detection means for detecting a power from the voltage changing circuit; voltage determination means for determining what voltage is to be set by the voltage changing circuit so that an output power detected by the output power detection means is maximum; reception means for receiving the array output power data from the control management device; a bypass circuit via which the current from said one solar battery bypasses the voltage changing circuit to be outputted to outside; bypass determination means for determining that the current from said one solar battery is to be outputted to outside via the voltage changing circuit when a ratio of a power from said one solar battery which is detected by the output power detection means to an output power indicated by the array output power data received by the reception means is not more than a predetermined value, and determining that the current from said one solar battery is to be outputted to outside via the bypass circuit when the ratio is more than the predetermined value.

In order to solve the foregoing problem, a method of the present invention for controlling a voltage setting device is a method for controlling a voltage setting device which is connected with one of a plurality of solar batteries included in a solar battery array, which sets a voltage to a current from said one solar battery, and which outputs the current at the voltage to outside, including the steps of: (i) detecting a power from a voltage changing circuit capable of changing the voltage; (ii) determining what voltage is to be set by the voltage changing circuit so that an output power detected in the step (i) is maximum; (iii) receiving array output power data from a control management device for generating the array output power data via a communication network, the array output power data being indicative of a sum of powers outputted from the plurality of solar batteries included in the solar battery array; and (iv) when a ratio of a power from said one solar battery which is detected in the step (i) to an output power indicated by the array output power data received in the step (iii) is not more than a predetermined value, determining that the current from said one solar battery is to be outputted to outside via the voltage changing circuit, and when the ratio is more than the predetermined value, determining that the current from said one solar battery is to be outputted to outside via a bypass circuit via which the current from said one solar battery bypasses the voltage changing circuit to be outputted to outside.

With the arrangement, it is possible to detect a power from the power changing circuit when a direct current voltage from the solar battery is inputted to the power changing circuit and outputted therefrom. The solar battery may be a cell which is a photovoltaic power generation element, may be a cluster or a module in which a plurality of cells are connected in series, may be a string in which a plurality of modules are connected in series, or may be an array in which a plurality of strings are connected in parallel.

While detecting the power from the voltage changing circuit, there is determined what voltage is to be set by the voltage changing circuit so that the detected power is maximum.

Accordingly, it is possible to subdue a loss when a voltage is set by the voltage changing circuit and a current at the voltage is outputted to outside (so-called DCDC conversion). Consequently, it is possible to obtain the maximum output power from the voltage changing circuit which power could not be obtained only by maximizing the output from the solar battery. In other words, with the arrangement, it is possible to efficiently use solar energy.

There is a loss in power when a voltage is set by the voltage changing circuit to a current from the solar battery and the current at the set voltage is outputted to outside.

With the arrangement, there is provided the bypass circuit via which a current bypasses the voltage changing circuit to be outputted to outside, and it is possible to determine whether the current from the solar battery is to be outputted via the voltage changing circuit or via the bypass circuit.

Accordingly, it is possible to output a current to outside via the bypass circuit if necessary.

As described above, by outputting a current to outside via the bypass circuit if necessary, it is possible to prevent a loss in power at the voltage changing circuit.

With the arrangement, array output power data indicative of a sum of powers from the plurality of solar batteries is received from the control management device for generating the array output power data, and based on a power from the solar battery array which is indicated by the received array output power data, it is possible to determine whether a current is to be outputted to outside via the bypass circuit or not.

To be more specific, when the ratio of the detected power from the solar battery to the output power indicated by the array output power data received by the reception means is not more than the predetermined value, it is determined that the current from the solar battery is to be outputted to outside via the voltage changing circuit, and when the ratio is more than the predetermined value, it is determined that the current from the solar battery is to be outputted to outside via the bypass circuit.

As described above, by outputting the current to outside via the bypass circuit if necessary, it is possible to prevent a loss in power at the voltage changing circuit. For example, the ratio of the power from the solar battery being smaller than a supposed ratio indicates that the solar battery outputs a smaller power than other solar batteries in the solar battery array to which the solar battery belongs do. In such a case, it is determined that the current is to be outputted to outside via the voltage changing circuit.

Advantageous Effects of Invention

A voltage setting device of the present invention is a voltage setting device for setting a voltage to a current from a solar battery and outputting the current at the voltage to outside, including: a voltage changing circuit capable of changing the voltage; output power detection means for detecting a power from the voltage changing circuit; voltage determination means for determining what voltage is to be set by the voltage changing circuit so that an output power detected by the output power detection means is maximum; a bypass circuit via which the current from the solar battery bypasses the voltage changing circuit to be outputted to outside; bypass determination means for determining whether the current from the solar battery is to be outputted to outside via the voltage changing circuit or via the bypass circuit; power measurement means for measuring a power from the solar battery; a short-circuit switching circuit for switching between a state where a cathode output terminal for outputting a voltage to outside and an anode output terminal are short-circuited and a state where the cathode output terminal and the anode output terminal are not short-circuited; and short-circuit determination means for, when the power measured by the power measurement means is not more than a predetermined value, switching the short-circuit switching circuit to the state where the cathode output terminal and the anode output terminal are short-circuit.

A method of the present invention for controlling a voltage setting device is a method for controlling a voltage setting device for setting a voltage to a current from a solar battery and outputting the current at the voltage to outside, including the steps of: (i) detecting a power from a voltage changing circuit capable of changing the voltage; (ii) determining what voltage is to be set by the voltage changing circuit so that an output power detected in the step (i) is maximum; (iii) determining whether the current from the solar battery is to be outputted to outside via the voltage changing circuit or via a bypass circuit via which the current from the solar battery bypasses the voltage changing circuit to be outputted to outside; (iv) measuring a power from the solar battery; and (v) when the power measured in the step (iv) is not more than a predetermined value, switching a short-circuit switching circuit from a state where a cathode output terminal for outputting a voltage to outside and an anode output terminal are not short-circuited to a state where the cathode output terminal and the anode output terminal are short-circuited.

Accordingly, it is possible to prevent a loss in power at the voltage changing circuit by outputting the current to outside via the bypass circuit if necessary.

Furthermore, it is possible to prevent a solar battery with decreased output from having an adverse influence on powers from other solar batteries as a whole.

A voltage setting device of the present invention is a voltage setting device which is connected with one of a plurality of solar batteries included in a solar battery array, which sets a voltage to a current from said one solar battery, and which outputs the current at the voltage to outside, the voltage setting device being communicably connected with a control management device for generating array output power data indicative of a sum of powers outputted from the plurality of solar batteries included in the solar battery array, the voltage setting device including: a voltage changing circuit capable of changing the voltage; output power detection means for detecting a power from the voltage changing circuit; voltage determination means for determining what voltage is to be set by the voltage changing circuit so that an output power detected by the output power detection means is maximum; reception means for receiving the array output power data from the control management device; a bypass circuit via which the current from said one solar battery bypasses the voltage changing circuit to be outputted to outside; bypass determination means for determining that the current from said one solar battery is to be outputted to outside via the voltage changing circuit when a ratio of a power from said one solar battery which is detected by the output power detection means to an output power indicated by the array output power data received by the reception means is not more than a predetermined value, and determining that the current from said one solar battery is to be outputted to outside via the bypass circuit when the ratio is more than the predetermined value.

A method of the present invention for controlling a voltage setting device is a method for controlling a voltage setting device which is connected with one of a plurality of solar batteries included in a solar battery array, which sets a voltage to a current from said one solar battery, and which outputs the current at the voltage to outside, including the steps of: (i) detecting a power from a voltage changing circuit capable of changing the voltage; (ii) determining what voltage is to be set by the voltage changing circuit so that an output power detected in the step (i) is maximum; (iii) receiving array output power data from a control management device for generating the array output power data via a communication network, the array output power data being indicative of a sum of powers outputted from the plurality of solar batteries included in the solar battery array; and (iv) when a ratio of a power from said one solar battery which is detected in the step (i) to an output power indicated by the array output power data received in the step (iii) is not more than a predetermined value, determining that the current from said one solar battery is to be outputted to outside via the voltage changing circuit, and when the ratio is more than the predetermined value, determining that the current from said one solar battery is to be outputted to outside via a bypass circuit via which the current from said one solar battery bypasses the voltage changing circuit to be outputted to outside.

Accordingly, it is possible to prevent a loss in power at the voltage changing circuit by outputting the current to outside via the bypass circuit if necessary.

BRIEF DESCRIPTION OF DRAWINGS

FIG. 3 is a table for explaining a relationship among an output from a module, a loss in power caused by DCDC conversion, and an output from a secondary side of an output converter.

DESCRIPTION OF EMBODIMENTS

Embodiment 1

With reference to FIGS. 1 to 8, the following explains one embodiment of the present invention.
(Configuration of Photovoltaic Power Generation System)

Figure 2:
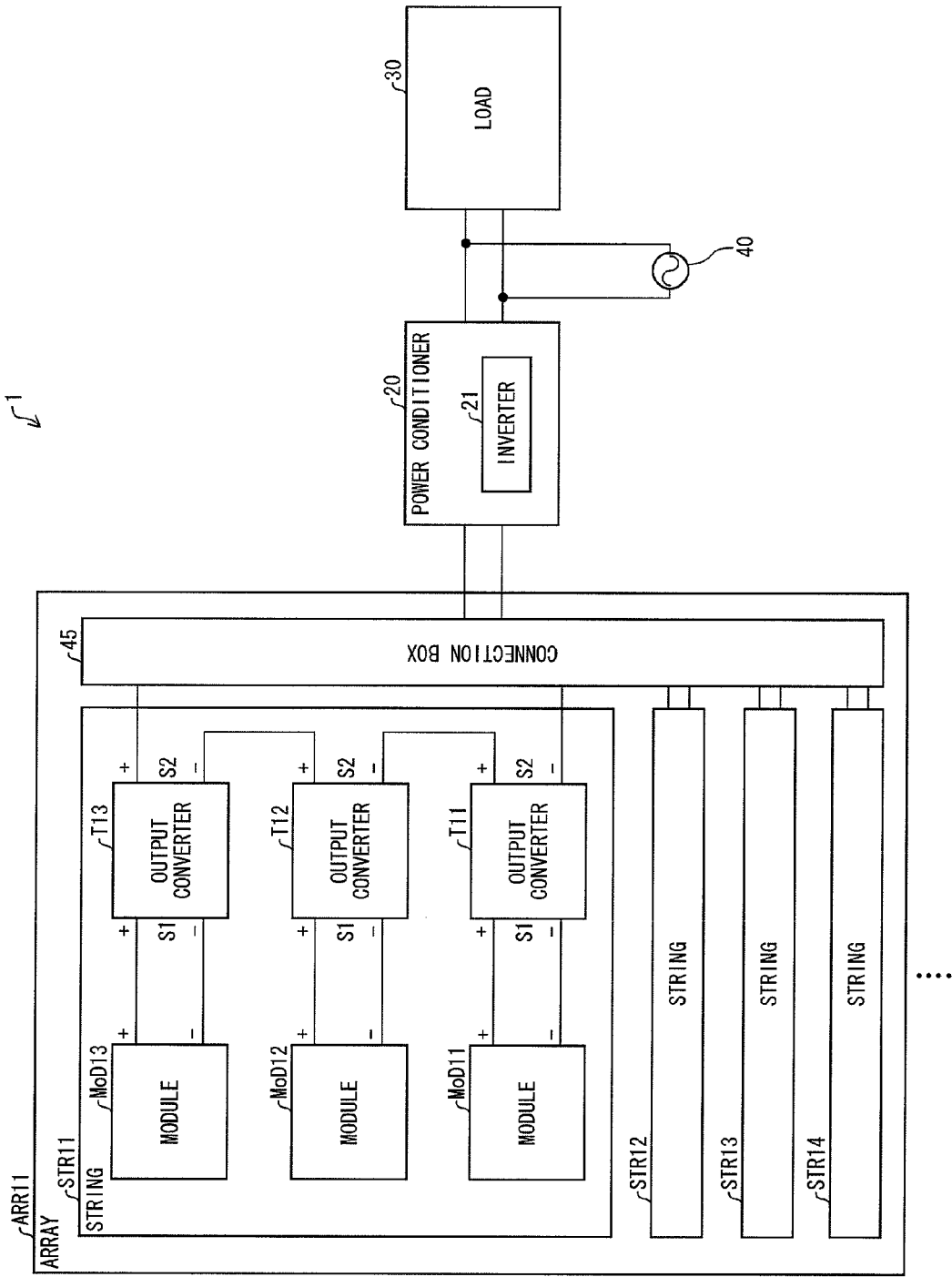
FIG. 2 is a functional block diagram showing a schematic configuration of a photovoltaic power generation system in accordance with one embodiment of the present invention.

Initially, with reference to FIG. 2, an explanation is made as to a schematic configuration of a photovoltaic power generation system in accordance with the present embodiment.

As shown in FIG. 2, a photovoltaic power generation system 1 includes a solar battery array (hereinafter merely referred to as array) ARR11, a power conditioner 20, and a load 30.

The array ARR11 is a unit in which a plurality of solar battery strings (hereinafter merely referred to as string) STR11 to STR 14 are connected in parallel in a connection box 45. In FIG. 2, for convenience of explanation, only the array ARR11 is described in the photovoltaic power generation system 1. However, the photovoltaic power generation system 1 may include a plurality of arrays.

The strings STR11 to STR14 are blocks in each of which a plurality of solar battery modules (hereinafter merely referred to as module) are connected in series. The string STR11 includes modules MOD11 to 13.

Since the strings STR12 to STR14 have the same configuration as that of the string STR11, the strings STR12 to STR14 are omitted in FIG. 2. It should be noted that the configuration of FIG. 2 is merely an example of the photovoltaic power generation system 1, and the number of strings in the array ARR11 is not limited to four (strings STR11 to 14).

Each of the modules MOD11 to MOD13 includes a plurality of solar cells (hereinafter merely referred to as cell).

Each of output converters (voltage setting devices) T11 to T13 carries out DCDC conversion (direct current voltage conversion) of a power inputted to a primary side S1 and outputs the converted power from a secondary side S2.

In FIG. 2, the output converters T11 to T13 are connected with the modules MOD11 to MOD13, respectively.

Connections between the output converters T11 to T13 and the modules MOD11 to MOD13 are explained below by using the output converter T11 as an example. Specifically, a primary side cathode S1+ of the output converter T11 is connected with a cathode of the module MOD11, and a primary side anode S1− is connected with an anode of the module MOD11.

A power from the cathode of the module MOD11 is inputted to the primary side S1 of the output converter T11, and is subjected to DCDC conversion by the output converter T11 and is outputted from the secondary side S2 of the output converter T11.

Since the connections between the output converters T12 and T13 and their respective modules are the same as the connection between the output converter T11 and its module, explanations thereof are omitted.

Connections among the output converters T11 to T13 are as follows.

Initially, the secondary side anode (anode output terminal) S2− of the output converter T11 is connected with a connection box 45, and the secondary side cathode (cathode output terminal) S2+ is connected with the secondary side anode S2− of the output converter T12.

The secondary side cathode S2+ of the output converter T12 is connected with the secondary side anode S2− of the output converter T13, and the secondary side cathode S2+ of the output converter T13 is connected with the connection box 45.

The power conditioner 20 adjusts a power from the array ARR11 so that the power can be supplied to the load 30.

The photovoltaic power generation system 1 may be configured to include a commercial power line 40 and to be capable of operating in connection with the commercial power line 40 or may be configured to operate independently of any commercial power line.

The load 30 is a target to which a power is supplied. A typical example of the load 30 is an electric device to be operated by receiving a power supply.

(Module and Output Converter)

Figure 1:
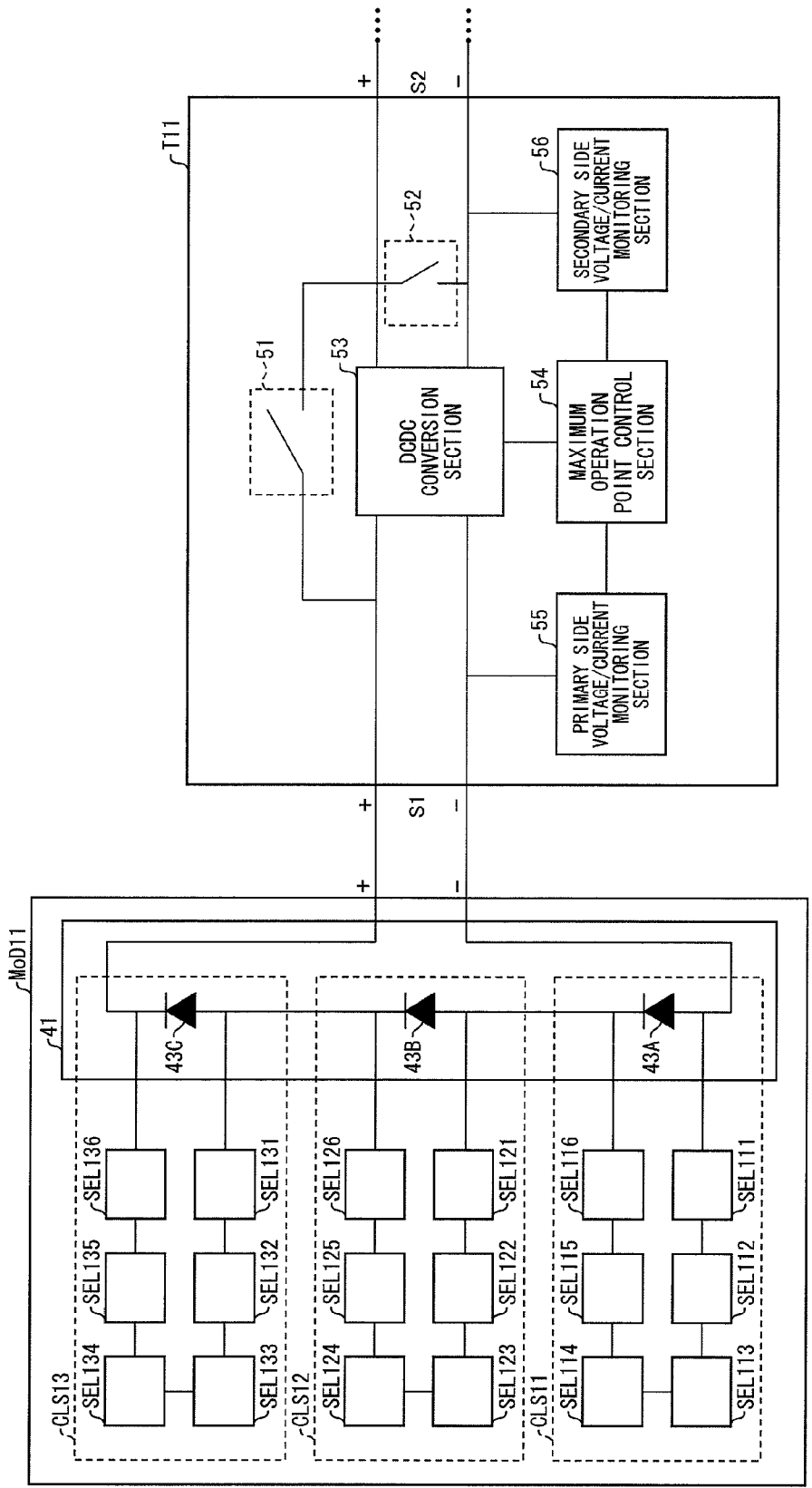
FIG. 1 is a functional block diagram showing examples of configurations of a module and an output converter in accordance with one embodiment of the present invention.

With reference to FIG. 1, the following explains examples of configurations of the module MOD11 and the output converter T11.

[Module]

As shown in FIG. 1, the module (solar battery) MOD11 includes three clusters CLS11 to CLS13.

The cluster CLS11 is a unit including six cells SEL111 to SEL116 and a bypass diode 43A.

The cells SEL111 to SEL116 are connected in series. The bypass diode 43A is connected in parallel with the cells SEL111 to SEL116.

When one of the six cells SEL111 to SEL116 in the cluster CLS11 drops its power generation capacity due to some reason, the bypass diode 43A causes a current having flowed into the cluster CLS11 to bypass the cluster CLS11 so that other clusters can generate a power normally.

Since the clusters CLS12 and CLS13 have the same configurations as that of the cluster CLS11, explanations thereof are omitted. The clusters CLS11 to CLS13 are connected in series in a terminal box 41.

[Output Converter]

With reference to FIG. 1, the following explains the output converter T11.

The output converter T11 carries out DCDC conversion of the output from the module MOD11. The output converter T11 includes a DCDC short-circuit switch (bypass circuit) 51, a module short-circuit switch (short-circuit switching circuit) 52, a DCDC conversion section (voltage changing circuit) 53, maximum operation point control section (voltage determination means, bypass determination means, short-circuit determination means) 54, a primary side voltage/current monitoring section (power measurement means) 55, and a secondary side voltage/current monitoring section (output power detection means) 56.

In a case where the output from the module MOD11 is sufficiently high as not to require DCDC conversion, the DCDC short-circuit switch 51 is used to cause the power from the module MOD11 to the primary side S1 to bypass the DCDC conversion section 53 and to be outputted to the secondary side S2.

The DCDC short-circuit switch 51 is connected with the primary side cathode S1+ and the secondary side cathode S2+, and opens between the primary side cathode S1+ and the secondary side cathode S2+ when the DCDC short-circuit switch 51 is in an off-state. When the DCDC short-circuit switch 51 is in an on-state, the DCDC short-circuit switch 51 short-circuits between the primary cathode S1+ and the secondary cathode S2+ to form a circuit which bypasses the DCDC conversion section 53.

On/off control of the DCDC short-circuit switch 51 is made by the maximum operation point control section 54. The on/off control will be detailed later.

When the input power from the module MOD11 is not more than a predetermined value, the module short-circuit switch 52 cuts off the module MOD11 from the circuit.

The predetermined value may be determined based on, for example, an input power which is so small as to be unable to be subjected to DCDC conversion or an input power which is so small that DCDC conversion of the input power does not generate a sufficient output.

The module short-circuit switch 52 is connected with the secondary side anode S2− and the secondary side cathode S2+, and opens between the secondary side anode S2− and the secondary side cathode S2+ when the module short-circuit switch 52 is in an off-state. When the module short-circuit switch 52 is in an on-state, the module short-circuit switch 52 short-circuits between the secondary side anode S2− and the secondary side cathode S2+ to cut off the module MOD11 from the circuit in the string.

On/off control of the module short-circuit switch 52 is made by the maximum operation point control section 54. The on/off control will be detailed later.

Under control of the maximum operation point control section 54, the DCDC conversion section 53 carries out DCDC conversion of a voltage of a power inputted to the primary side S1 from the module MOD11, and outputs the converted voltage to the secondary side S2.

The primary side voltage/current monitoring section 55 monitors an output voltage/output current from the module MOD11, and notifies the maximum operation point control section 54 of the measured output voltage/output current from the module MOD11 or an input power at the S1 side which is derived from the measured output voltage/output current.

The secondary side voltage/current monitoring section monitors an output voltage/output current from the secondary side S2 of the output converter T11, and notifies the maximum operation point control section 54 of the measured output voltage/output current from the secondary side S2 of the output converter T11 or an output power at the secondary side S2 which is derived from the measured output voltage/output current.

The maximum operation point control section 54 controls, based on the output voltages/output currents measured by the primary side voltage/current monitoring section 55 and the secondary side voltage/current monitoring section 56, the output from the secondary side S2 of the output converter T11 in such a manner that the output is maximum. That is, the maximum operation point control section 54 adjusts the output voltage/output current from the module MOD11 in such a manner that the output from the secondary side S2 is maximum.

Specifically, the maximum operation point control section 54 controls the DCDC conversion section 53 in such a manner that DCDC conversion is carried out based on a Duty value which maximizes the output from the secondary side S2 of the output converter T11.

The maximum operation point control section 54 may initially operate the module MOD11 by MPPT (Maximum Power Point Tracking) control in such a manner that the output from the primary side S1 is maximum, and then may carry out control in such a manner that the output from the secondary side S2 is maximum.

Since the operation point of the module MOD11 at which the output from the secondary side S2 is maximum is close to the maximum operation point of the module MOD11, it is possible to shorten the time to reach the operation point at which the output from the secondary side S2 is maximum.

Furthermore, the maximum operation point control section 54 controls opening/closing of the DCDC short-circuit switch 51 and the module short-circuit switch 52 based on the output voltages/output currents measured by the primary side voltage/current monitoring section 55 and the secondary side voltage/current monitoring section 56.

Since configurations of the modules MOD12 and MOD13 and the output converters T12 and T13 are the same as those of the module MOD11 and the output converter T11 as described above, explanations thereof are omitted here.

It should be noted that the above configurations are merely examples and configurations of cells, clusters, modules, strings, and arrays may be changed appropriately.

(Property of Solar Battery)

Here, a property of a solar battery is explained below. It is known that when a part of the module MOD11 is shaded for example and the output power from the shaded part drops, the efficiency in power generation by the module as a whole is greatly influenced, so that the total amount of power generation decreases greater than the amount of drop in the output power from the shaded part.

For example, when one of, a plurality of, or all of cells SEL111 to SEL116 are shaded, the shaded cell or cells drop the output power. Furthermore, there is a case where the drop of the output power from the shaded cell or cells results in a greater drop in the output from the module MOD11.

Furthermore, similarly, it is known that when one module in a string drops its output, the total amount of power generation by the string is influenced greatly.

(Specific Examples of Control by Maximum Operation Point Control Section)

[Control for Operation at Maximum Operation Point]

The DCDC conversion is accompanied by a loss in power. The range of the loss varies depending on the state of input/output control in the DCDC conversion. Accordingly, there is a case where even when the maximum output is obtained with respect to each module as a result of a conventional maximum power point tracking control (hereinafter referred to as MPPT control), an output after the DCDC conversion is larger when the solar battery is not operated at the maximum operation point.

Accordingly, when the power from the module MOD11, i.e. the power input to the primary side S1, is a predetermined power or more, the maximum operation point control section 54 carries out control as follows so that the power from the secondary side S2 is maximum.

Specifically, the maximum operation point control section 54 carries out control in such a manner that a Duty value varies in a range which allows the DCDC conversion, and the DCDC conversion section 53 carries out the DCDC conversion with a Duty value at which the output power from the secondary side S2 is maximum. That is, the maximum operation point control section 54 carries out control in such a manner that a voltage at which the output power from the secondary side S2 is maximum is set and the DCDC conversion section 53 carries out the DCDC conversion at the set voltage.

At that time, the maximum operation point control section 54 may operate the module MOD11 by the MPPT control so that a power input to the primary side S1 is maximum, and using the operation point as a reference, the maximum operation point control section 54 may search for a Duty value which maximizes a power from the secondary side S2.

That is, the maximum operation point control section 54 may initially cause the DCDC conversion section 53 to operate at a temporal voltage and then set a voltage which maximizes the output power from the secondary side S2, so that the DCDC conversion section 53 carries out the DCDC conversion at the set voltage.

This allows more promptly setting the voltage which maximizes the output power from the secondary side S2.

With reference to FIG. 3, the following explains an example of the control by the maximum operation point control section 54.

A relationship among the output from the module MOD11, a loss in power caused by the DCDC conversion, and the output from the secondary side of the output converter T11 can be expressed as equation (1) below.

That is, the output from the secondary side of the output converter can be expressed in equation (1) below.

[Output from secondary side of output converter]=
[Output from module (input to primary side of
output converter)]−[loss in power at output converter]     (1)

The loss in power at the output converter indicates a loss in power at the time when the DCDC conversion section 53 carries out the DCDC conversion.

As is seen from the equation (1), even when the output from the module MOD11 is maximum, if the loss in power at the output converter T11 is large, the output from the secondary side S2 of the output converter T11 is not necessarily maximum.

That is, in order to further increase the output from the secondary side S2 of the output converter T11, it is necessary to increase the output from the module MOD11 and at the same time reduce the loss in power at the output converter T11.

FIG. 3 shows cases where the output from the module MOD11 is "10", "9", and "8", respectively. The values in FIG. 3 were calculated while the maximum output power from the module MOD11 was "10". It should be noted that the table shown in FIG. 3 is merely an example and the loss at the output converter T11 varies depending on the input/output state of the DCDC conversion and is not necessarily equal to the value in FIG. 3. In FIG. 3, the output from the module MOD11 is "10" at most, and decreases in turn to "9" and "8".

The loss in power at the DCDC conversion is "4", "2", and "3", when the output from the module MOD11 is "10", "9", and "8", respectively.

Consequently, according to the equation (1), when the output from the module MOD11 is "10", the output from the secondary side of the output converter is "6", whereas when the output from the module MOD11 is "9", the output from the secondary side of the output converter is "7". As a result, a larger output is obtained when the output from the secondary side of the output converter is "6" than when the output from the module MOD11 is "10".

In this case, although the module MOD11 itself operates at the maximum operation point and the output of "10" is obtained, the output from the output converter T11 after the DCDC conversion is not maximum.

In order to deal with this, the maximum operation point control section 54 carries out control in such a manner that a Duty value is changed with the operation point corresponding to the output "10" as a reference so as to obtain the output "9" from the module MOD11. Consequently, it is possible to obtain the maximum output "7" after the DCDC conversion.

When the output from the module MOD11 is "8", the output from the secondary side of the output converter is "5", which is smallest among the outputs from the secondary side of the output converter.

[Control of DCDC Short-Circuit Switch]

As described above, the DCDC conversion is accompanied by the loss in power. Accordingly, when the output from the module is sufficiently large as not to require the DCDC conversion, it is preferable not to carry out the DCDC conversion in consideration of the efficiency in power generation of the photovoltaic power generation system.

This is because there is a case where when the output from the module MOD11 is subjected to the DCDC conversion, there may occur an output loss due to the DCDC conversion, resulting in a smaller output from the output converter T11 compared with when the output from the module MOD11 is not subjected to the DCDC conversion.

In order to deal with this, the maximum operation point control section 54 determines, based on measurement values such as voltage/current at the primary side and voltage/current at the secondary side, whether the output from the module MOD11 is sufficiently large as not to require the DCDC conversion. When the result of the determination shows that the output from the module MOD11 is sufficiently large as not to require the DCDC conversion, the maximum operation point control section 54 causes the DCDC short-circuit switch 51 to be in an on-state so that the DCDC conversion is bypassed.

On the other hand, when the result of the determination shows that the output from the module MOD11 requires the DCDC conversion, the maximum operation point control section 54 causes the DCDC short-circuit switch 51 to be in an off-state so that the DCDC conversion is carried out.

The maximum operation point control section 54 may determine, in terms of other various points, whether the output from the module MOD11 is sufficiently large as not to require the DCDC conversion.

For example, the maximum operation point control section 54 may determine that the output from the module MOD11 is sufficiently large as not to require the DCDC conversion when a ratio of the output power from the module to a nominal maximum output from the module is not less than a predetermined one.

Furthermore, in a case where an actinograph for measuring intensity of sunlight is provided near the module MOD11, the maximum operation point control section 54 receives a measurement value from the actinograph and determines, based on the received measurement value, whether all of the cells SEL111 to 116 in the module MOD11 receive sun radiation without being shaded, and when determining that all of the cells SEL111 to 116 receive sufficient sun radiation, the maximum operation point control section 54 may judge that the DCDC conversion is unnecessary.

Furthermore, the maximum operation point control section 54 may further judge whether performance degradation of the cells SEL111 to 116 such as malfunction occur.

When judging that none of the cells SEL111 to 116 are shaded but performance degradation of the cells SEL111 to 116 occurs, the maximum operation point control section 54 considers that the cells SEL111 to 116 do not output a sufficient power and carries out the DCDC conversion. On the other hand, when judging that none of the cells SEL111 to 116 are shaded and performance degradation of the cells SEL111 to 116 does not occur, the maximum operation point control section 54 judges that the DCDC conversion is unnecessary.

As described above, when the maximum operation point control section 54 can judge that the output from the module MOD11 is sufficiently large as not to require the DCDC conversion, the DCDC conversion is not carried out so as to increase the efficiency in power generation.

[Control of Module Short-Circuit Switch]

In a case where the output converter T11 receives from the module MOD11 only a power which is so small as not to be able to be subjected to the DCDC conversion, there is a possibility that separating the module MOD11 from the circuit of the string STR11 increases the efficiency in power generation by the string STR11 as a whole.

As such, the maximum operation point control section 54 judges whether the output from the module MOD11 is so small as not to be able to be subjected to the DCDC conversion. When judging that the output from the module MOD11 is so small as not to be able to be subjected to the DCDC conversion, the maximum operation point control section 54 puts the module short-circuit switch 52 in an on-state so as to cut off the module MOD11 from the circuit of the string STR11.

Specific examples where the output from the module MOD11 cannot be subjected to the DCDC conversion are as follows.

Initially, for example, there is a case where almost all of the cells SEL111 to 116 in the module MOD11 are shaded so that the output from the module MoD11 drops extremely.

Secondly, for example, there is a case where wires of the module MOD11 are broken due to a cause such as malfunction.

In such cases, the module short-circuit switch 52 short-circuits between the secondary side anode S2− and the secondary side cathode S2+ to bypass the module MOD11, thereby preventing outputs from other output converters T12 and T13 which are connected in series with the output converter T11 from being influenced.

(Flow of Process)

Figure 4:
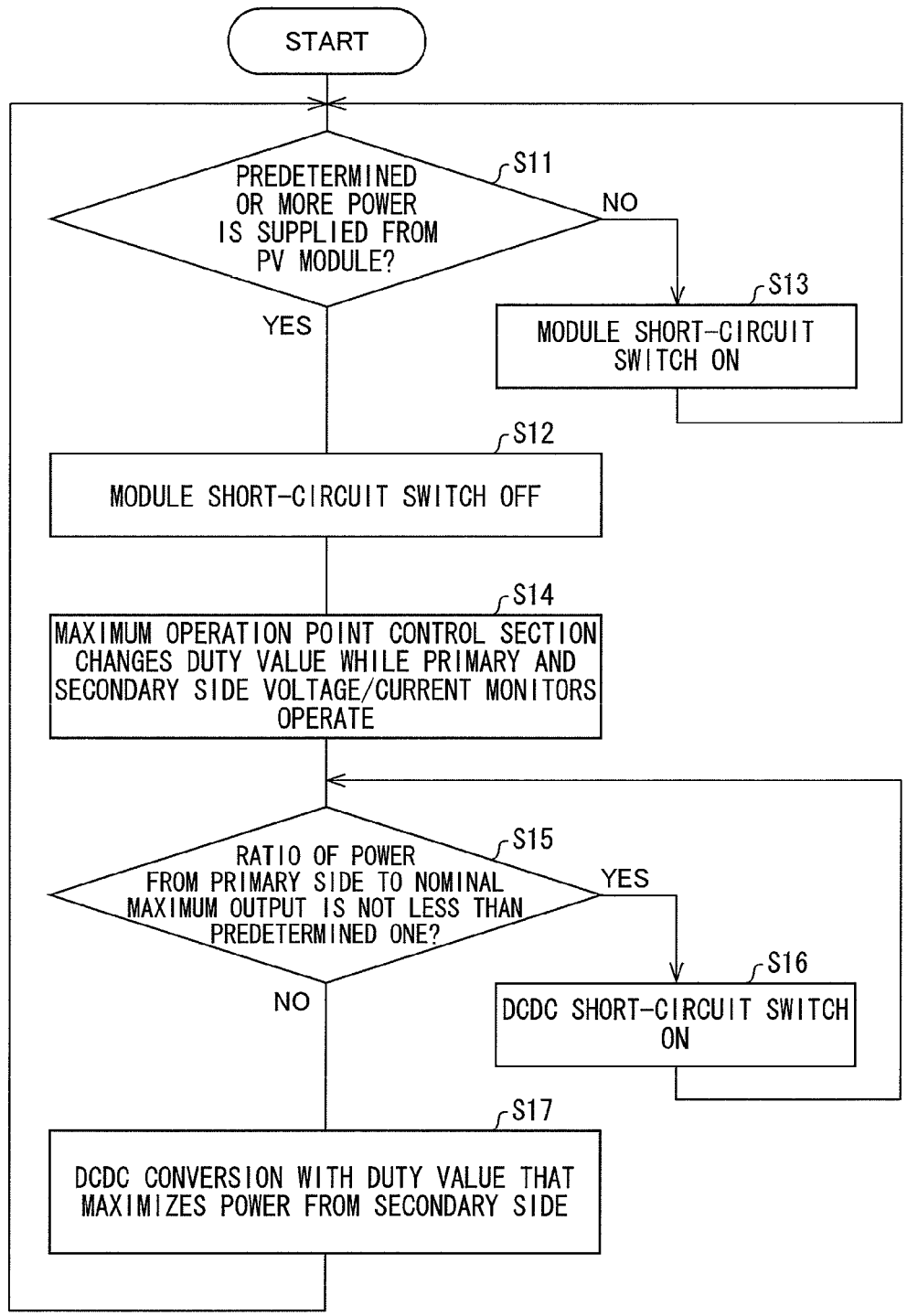
FIG. 4 is a flowchart showing a flow of a process carried out by an output converter in accordance with one embodiment of the present invention.

With reference to FIG. 4, the following explains a flow of a process carried out in the output converter T11.

Initially, in the output converter T11, the maximum operation point control section 54 calculates the output power from the module MOD11 based on the output voltage/output current to the primary side which the maximum operation point control section 54 has been notified of by the primary side voltage/current monitoring section 55, and judges whether the calculated power is a predetermined power or more (S11).

When the power outputted from the module MOD11 is less than the predetermined power (NO in S11), the maximum operation point control section 54 puts the module short-circuit switch 52 in an on-state so as to short-circuit between the secondary side anode S2− and the secondary side cathode S2+ (S13). After a predetermined cycle, the maximum operation point control section 54 restarts the process from S11.

On the other hand, when the power outputted from the module MOD11 is not less than the predetermined value (YES in S11), the maximum operation point control section 54 puts the module short-circuit switch 52 in an off-state (S12).

Subsequently, the maximum operation point control section 54 causes the primary side voltage/current monitoring section 55 and the secondary side voltage/current monitoring section 56 to measure a voltage/current at the primary side and a voltage/current at the secondary side to monitor an output power at the primary side and an output power at the secondary side, respectively. Then, the maximum operation point control section 54 changes a Duty value of the DCDC conversion section 53 so as to cause the module MOD11 to operate under MPPT control (S14).

Here, the maximum operation point control section 54 judges whether a ratio of the output power at the primary side to the nominal maximum output from the module MOD11 is not less than a predetermined one (S15).

When the ratio of the output from the module MOD11 to the nominal maximum output from the module MOD11 is not less than the predetermined one (YES in S15), the maximum operation point control section 54 puts the DCDC short-circuit switch 51 in an on-state so as to short-circuit between the primary side cathode S1+ and the secondary side cathode S2+ (S16).

Then, after a predetermined cycle, the maximum operation point control section 54 restarts the process from S15.

On the other hand, when the ratio of the output from the module MOD11 to the nominal maximum output from the module MOD11 is less than the predetermined one (NO in S15), the maximum operation point control section 54 keeps the DCDC short-circuit switch 51 in an off-state so as to cause the DCDC conversion section 53 to carry out the DCDC conversion. Here, the maximum operation point control section 54 causes the DCDC conversion section 53 to carry out the DCDC conversion while controlling the Duty value of the DCDC conversion section 53 so that the output from the secondary side is maximum (S17).

Then, after a predetermined cycle, the maximum operation point control section 54 restarts the process from S11.

The reason for returning from S16 to S15 instead of S11 is that since it is judged in the previous process of S15 that the ratio of the output from the module MOD11 to the nominal maximum output from the module MOD11 is not less than the predetermined one, it is unnecessary to determine whether the module short-circuit switch is to be in an on-state or an off-state unless there occurs extreme drop in output.

However, the present invention is not limited to this, and the process may return from S16 to S11.

In S15, it is judged whether the ratio of the output from the module MOD11 to the nominal maximum output from the module MOD11 is not less than the predetermined one or not to determine whether the DCDC short-circuit switch 51 is to be in an on-state or an off-state. However, the present invention is not limited to this, and whether the DCDC short-circuit switch 51 is to be in an on-state or an off-state may be determined based on the Duty value for operating the module MOD11.

For example, the DCDC short-circuit switch may be put in an on-state when the Duty value becomes a predetermined value or more.

Alternatively, the output converter T11 may be provided with a sunlight sensor for sensing sunlight intensity so as to monitor the sunlight intensity, and when sunlight intensity varies (decreases) by a predetermined value or more from the intensity since the DCDC short-circuit switch has been put in an on-state, the DCDC short-circuit switch may be put in an off-state.

In the process of S17, the output from the secondary side may be calculated by measuring a voltage and a current at the secondary side and obtaining the product of the voltage and the current, or may be calculated based on the output to the primary side and the Duty value used when the DCDC conversion section 53 carries out the DCDC conversion.

In the above explanation, the output power to the primary side is calculated based on the output voltage and the output current to the primary side. However, the present invention is not limited to this.

(I-V Characteristic of String)

Figure 5:
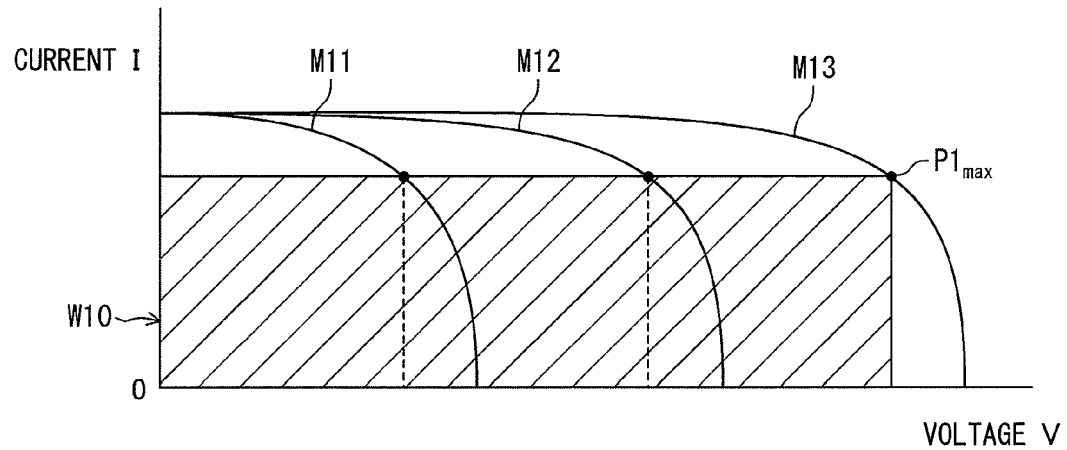
FIG. 5 is a graph showing I-V characteristic of a string in a case where modules constituting the string receive a sufficient amount of sunlight.
Figure 6:
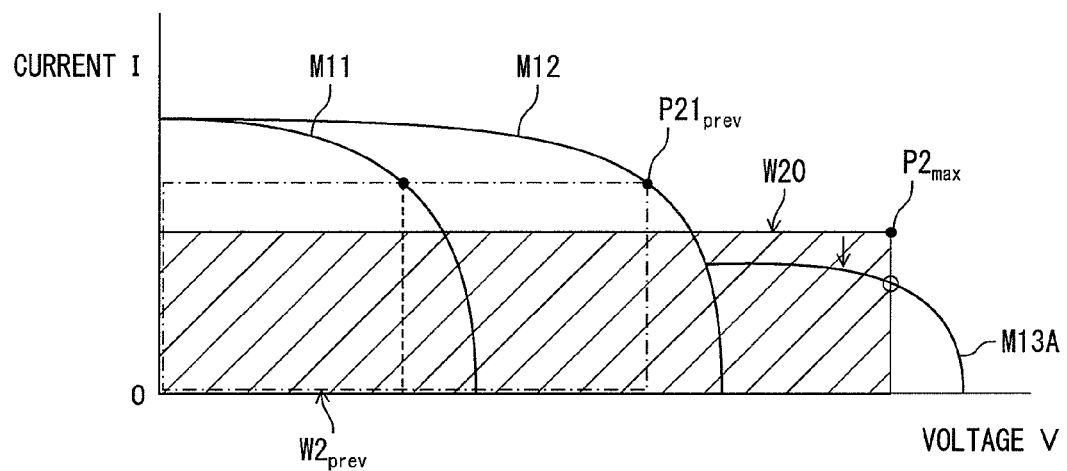
FIG. 6 is a graph showing I-V characteristic of a string in a case where one of three modules constituting the string is shaded and drops its output current.
Figure 7:
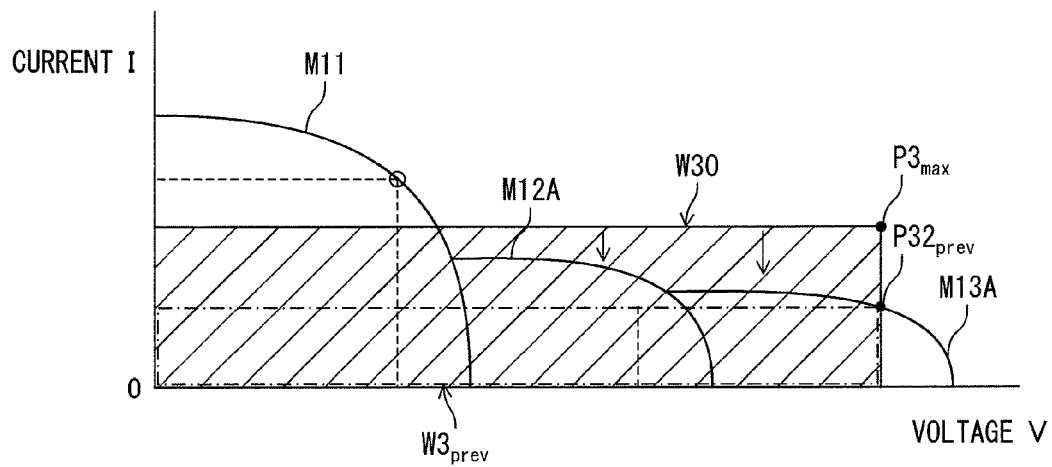
FIG. 7 is a graph showing I-V characteristic of a string in a case where two of three modules constituting the string are shaded and drop their output currents.

With reference to FIGS. 5 to 7, the following compares I-V characteristic of a conventional string with I-V characteristic of the string STR11 including the output converters T11 to T13 of the present invention and the modules MOD11 to MOD13.

[I-V Characteristic 1 of String]

Initially, with reference to FIG. 5, an explanation is made as to I-V characteristic of the string STR11 in a case where modules constituting the string STR11 receive sufficient sun radiation.

In FIG. 5, a curve M11 indicates I-V characteristic of one module, a curve M12 indicates I-V characteristic of two modules connected in series, and a curve M13 indicates I-V characteristic of three modules connected in series.

Here, the modules MOD11 to MOD13 output powers at their respective maximum output operation points resulting from the MPPT control, and consequently the maximum output operation point of the string STR11 is an operation point P1max.

The rectangular area formed by the origin O and the operation point P1max is an output power W10 from the string STR11.

[I-V Characteristic 2 of String]

Next, with reference to FIG. 6, an explanation is made as to I-V characteristic of a string in a case where one of three modules constituting the string is shaded and drops its output current.

In the example shown in FIG. 6, one of the modules MOD11 to MOD13 drops its output current due to shading etc. In the drawing, a curve consisting of curves M13A and M12 indicates I-V characteristic of three modules connected in series.

Conventionally, the operation point control was carried out along the curve consisting of the curves M13A and M12.

In the example shown in FIG. 6, as a result of the MPPT control along the curve consisting of the curves M13A and M12, the string was controlled to operate at an operation point P21prev indicative of the maximum output. However, the resulting output power was only W2prev.

The operation states of the modules at the output power of W2prev are such that only the modules exhibiting normal output current characteristics operate at their maximum operation points and output powers, and the module with decreased output current does not output a power at all.

In contrast thereto, in the output converter T13 of the present invention, even when the output current from the module MOD13 drops, not only normal modules but also a module with decreased output current can output a power as a result of the DCDC conversion. That is, it is possible to obtain an output which cannot be obtained on the curve consisting of the curves M13A and M12.

In the present invention, the output can be obtained at the operation point of P2max, which is larger than the output at the operation point of P21prev.

That is, even when the output from the module MOD13 drops due to shading etc., if the output from the secondary side is larger when the solar battery operates at the operation point P2max as a result of DCDC conversion, the maximum operation point control section 54 carries out control so that the solar battery operates at the operation point P2max. As a result, an output power of W20 can be obtained.

An additional explanation is made below as to a relationship between the voltage at P2max in FIG. 6 and the voltage at P1max in FIG. 5.

The voltage at P2max in FIG. 6 is determined in connection with voltages of other strings connected in parallel.

Consequently, depending on voltages of other strings connected in parallel, there is a case where the voltage at P2max is not equal to the voltage at P1max shown in FIG. 5.

On the other hand, it is possible to carry out the DCDC conversion in such a manner that the voltage at P2max in FIG. 6 is equal to the voltage at P1max in FIG. 5. For example, the DCDC conversion may be carried out in such a manner that voltages of other strings are equal to the voltage at P1max.

[I-V Characteristic 3 of String]

Next, with reference to FIG. 7, an explanation is made as to I-V characteristic of a string in a case where two of three modules constituting the string are shaded and drop their output currents.

In the example shown in FIG. 7, two of the modules MOD11 to MOD13 drop their output currents due to shading etc. In the drawing, a curve consisting of curves M11, M12A, and M13A indicates I-V characteristic of three modules connected in series.

Conventionally, the operation point control was carried out along the curve consisting of the curves M11, M12A, and M13A.

In the example shown in FIG. 7, as a result of the MPPT control along the curve consisting of the curves M11, M12A, and M13A, the string was controlled to operate at an operation point P32prev indicative of the maximum output. Consequently, the resulting output power was W3prev at most.

In contrast thereto, in the output converters T12 and T13 of the present invention, even when the output currents from the modules MOD 12 and MOD13 drop, the DCDC conversion allows obtaining an output P3max at an operation point which is not on the curve consisting of the curves M11, M12A, and M13A. Accordingly, it is possible to obtain an output power W30 which is larger than W3prev.

A relationship between the voltage at P3max in FIG. 7 and the voltage at P1max in FIG. 5 is similar to the relationship between the voltage at P2max in FIG. 6 and the voltage at P1max in FIG. 5 as supplementary described above, and so explanation thereof is omitted.

(Operation and Effect)

As described above, the output converter T11 of the present invention is the output converter T11 which sets a voltage to a current from the module MOD11 and outputs the current at the voltage to outside, including: the DCDC conversion section 53 capable of changing the voltage; the secondary side voltage/current monitoring section 56 for detecting a power from the DCDC conversion section 53; and the maximum operation point control section 54 for determining what voltage is to be set by the DCDC conversion section 53 so that the output power detected by the secondary side voltage/current monitoring section 56 is maximum.

Consequently, it is possible to subdue a loss in the DCDC conversion and to obtain the maximum output power after the DCDC conversion which power could not be obtained merely by maximizing the output from the module MOD11.

Modification Examples

The following explains preferable modification examples of the output converter T11 in accordance with the present embodiment.

[Modification Example of Output Converter]

The DCDC short-circuit switch 51 and the module short-circuit switch 52 of the output converter 11 may be realized by publicly known techniques such as relays, diodes, and MOS. Where to fix the DCDC short-circuit switch and the module short-circuit switch 52 in the output converter may be set freely. For example, the output converter T11 may be provided in a junction box at the back surface of the module, or may be provided outwardly on the junction box.

Furthermore, the cycle of the control of the maximum operation point control section 54 may be variable. This allows preventing the output converter T11 from being influenced by voltage/current controls by other output converters T12 and T13 connected in series with the output converter T11. That is, by differentiating the cycles of the voltage/current controls by the output converters T11 to T13, it is possible to prevent the controls by the output converters T11 to T13 from influencing one another.

[Modification Example of Connection of Output Converter]

Figure 8:
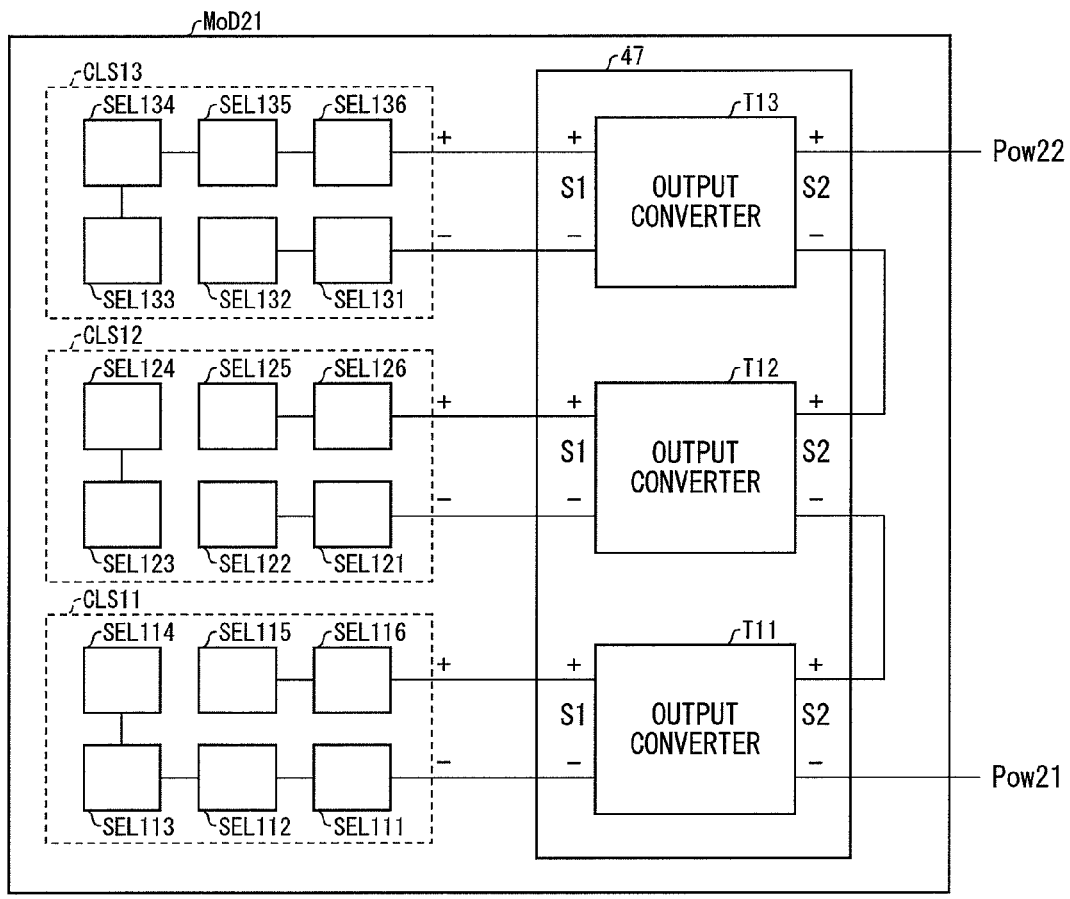
FIG. 8 is a block diagram showing a configuration example in which output converters are connected in a cluster.

With reference to FIG. 8, the following explains a modification example of connection of the output converter T11.

Schematically, a difference between the configuration example shown in FIG. 2 and the configuration example shown in the present modification example is as follows.

In the configuration example shown in FIG. 2, the output converters T11 to T13 are provided with respect to each module. In contrast thereto, in the present modification example, as shown in FIG. 8, the output converters T11 to T13 are provided with respect to each cluster (solar battery cluster).

The present modification example is explained in more detail below.

As shown in FIG. 8, a module MOD21 includes the output converters T11 to T13 and clusters CLS11 to CLS13 each consisting of six cells.

The cluster CLS11 is a unit consisting of six cells SEL111 to SEL116 connected in series. Similarly, the cluster CLS12 is a unit consisting of six cells SEL121 to SEL126 connected in series, and the cluster CLS13 is a unit consisting of six cells SEL131 to SEL136 connected in series.

An explanation is made by using the output converter T11 as an example. A primary side anode S1− of the output converter T11 is connected with an anode of the cluster CLS11, i.e. the cell SEL111. A primary side cathode S1+ of the output converter T11 is connected with a cathode of the cluster CLS11, i.e. the cell SEL116.

Since relationships between the output converters T12 and T13 and corresponding clusters are the same as the relationship between the output converter T11 and the corresponding cluster, explanations thereof are omitted.

Connections among the output converters T11 to T13 are as follows.

Initially, a secondary side anode S2− of the output converter T11 is connected with a module input Pow21 of the module MOD21, and a secondary side cathode S2+ is connected with a secondary side anode S2− of the output converter T12.

A secondary side cathode S2+ of the output converter T12 is connected with a secondary side anode S2− of the output converter T13, and a secondary side cathode S2+ of the output converter T13 is connected with a module output Pow22 of the module MOD21.

The output converters T11 to T13 may be connected with one another in a connection box 47.

With the arrangement of the modification example, it is possible to reduce a loss in power caused when certain cluster with decreased power generation performance influences other clusters in the same module. Besides, with the arrangement, the output converters T11 to T13 serve as the bypass diodes 43A to 43C in the module MOD11 shown in FIG. 1.

Consequently, the bypass diodes 43A to 43C are not required in the circuit configuration.

As described above, each of the output converters T11 to T13 may be connected with, for example, a cluster instead of a module.

In the present modification example, the output converters T11 to T13 are connected with the clusters CLS11 to CLS13, respectively. Alternatively, each of the output converters T11 to T13 may be connected with a cell.

That is, by designing the output converters T11 to T13 to be connectable with solar batteries, it is possible to subdue a loss in the DCDC conversion and to obtain the maximum output power after the DCDC conversion which power could not be obtained by simply maximizing the output from the solar batteries.

The solar batteries include cells serving as photovoltaic power generation elements, clusters or modules in each of which a plurality of cells are connected in series, strings in each of which modules are connected in series, and arrays in each of which strings are connected in parallel.

Embodiment 2

Figure 9:
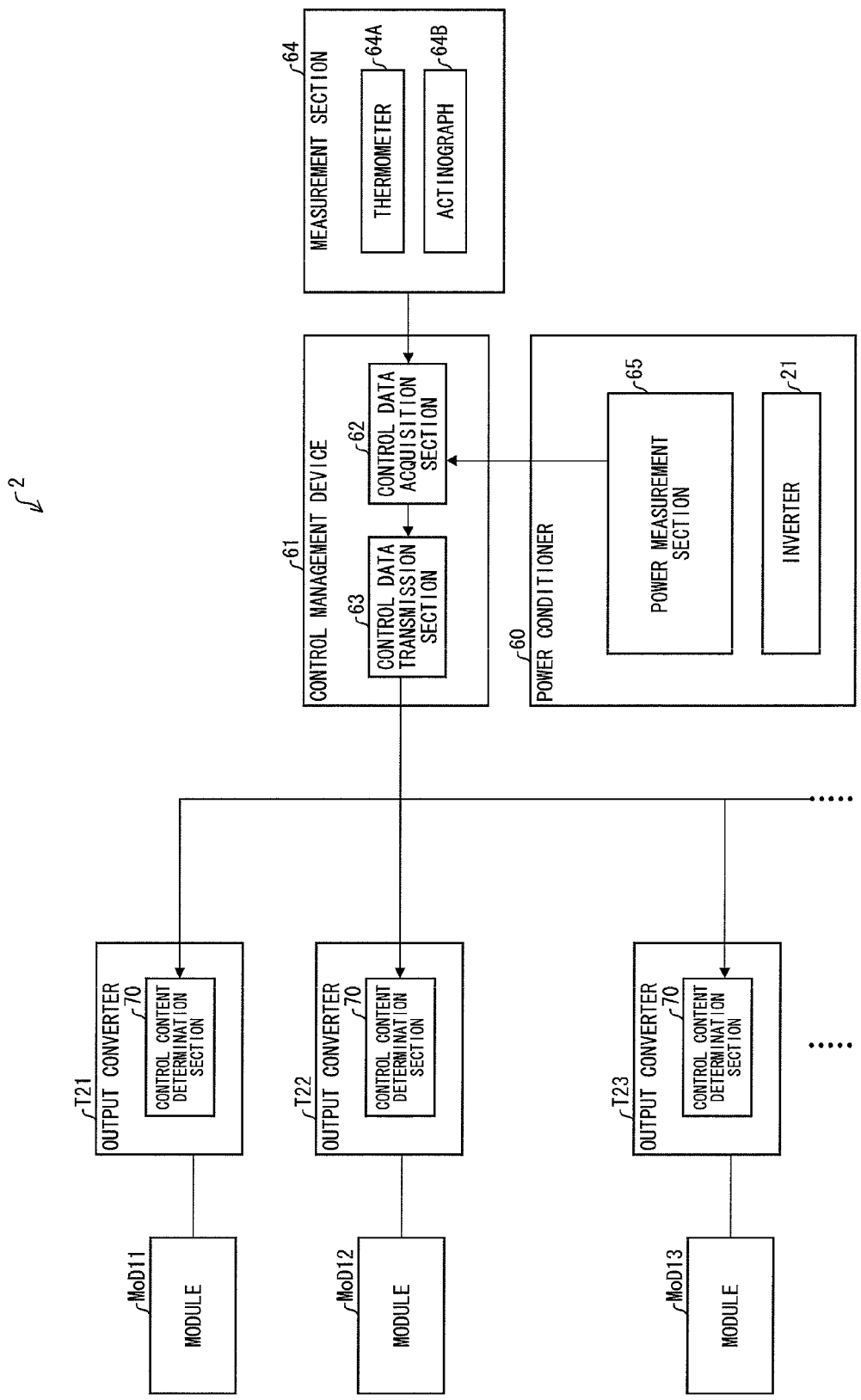
FIG. 9 is a block diagram showing a schematic configuration of a photovoltaic power generation system in accordance with another embodiment of the present invention.

With reference to FIG. 9, the following explains another embodiment of the present invention. In the present embodiment, an explanation is made as to a case where a photovoltaic power generation system includes various sensors and a control management device controls output converters in the photovoltaic power generation system in accordance with the results of measurements by the sensors.

(Configuration of Photovoltaic Power Generation System)

Initially, with reference to FIG. 9, an explanation is made as to a schematic configuration of a photovoltaic power generation system 2 in accordance with the present embodiment. For convenience of explanation, members having the same functions as those in the drawings explained in the Embodiment 1 are given the same reference signs and explanations thereof are omitted.

The photovoltaic power generation system 2 includes modules MOD11, MOD12, MOD13, . . . , output converters T21, T22, T23, . . . , a power conditioner 60, and a control management device 61.

In FIG. 9, it is not clearly shown whether the modules MOD11, MOD12, MOD13, . . . in particular are included in one array or in one string. Needless to say, the modules MOD11, MOD12, MOD13, . . . may be appropriately designed to belong to the same array/string or different arrays/strings.

As an example, the output converters T21, T22, T23, . . . are connected with the modules MOD11, MOD12, MOD13, . . . , respectively. Alternatively, each of the output converters T21, T22, T23, . . . may be connected with a cluster or a cell as described above.

The photovoltaic power generation system 2 in FIG. 9 is different from the photovoltaic power generation system 1 in FIG. 2 in that the photovoltaic power generation system 2 in FIG. 9 further includes a control management device 61, the power conditioner 60 includes a power measurement section 65, and each of the output converters T11 to T13 further includes a control content determination section (voltage determination means, bypass determination means, short-circuit determination means, reception means) 70.

In the photovoltaic power generation system 2, the control management device 61 is connected with the output converters T21, T22, T23, . . . via a communication network. Thus, the photovoltaic power generation system 2 realizes one-way communication from the control management device 61 to the output converters T21, T22, T23, . . . . Furthermore, the control management device 61 is connected with the power conditioner 60 via the communication network so as to realize communication at least from the power conditioner 60 to the control management device 61.

In FIG. 9, descriptions relating to connections of power lines and to loads are omitted.

(Details in Differences)

With reference to FIG. 9, the following specifically explains the control management device 61, and the control content determination section 70 included in each of the output converters T21, T22, T23 . . . .

Initially, an explanation is made as to the power measurement section 65 included in the power conditioner 60.

The power measurement section 65 measures a power from an array as a whole or a string as a whole which is connected with the power conditioner 60, and generates power data (array output power data).

Next, an explanation is made as to the control management device 61. The control management device 61 includes a control data acquisition section 62 and a control data transmission section 63.

The control data acquisition section 62 acquires data by which the output converters T21, T22, T23, . . . determine control contents. The control data acquisition section 62 acquires power data from the power measurement section 65.

Furthermore, the control data acquisition section 62 is connected with the measurement section 64 including various measurement sensors, and receives various measurement data from the measurement section 64.

Typically, the measurement section 64 includes a thermometer 64A and an actinograph 64B. The thermometer 64A measures an outdoor air temperature, and is positioned around the solar battery array in such a manner that the thermometer 64A does not receive direct sunlight. The actinograph 64B measures intensity of sunlight to the solar battery, and is positioned on the solar battery array in such a manner as to form the same inclination angle as the solar battery array.

The control data acquisition section 62 acquires power data from the power measurement section 65 and temperature data and sunlight intensity data from the measurement section 64, and transfers the acquired data to the control data transmission section 63.

The control data transmission section 63 transmits, to the control content determination section 70 included in each of the output converters T21, T22, T23, . . . , control data which is the temperature data, the sunlight intensity data, and the power data transferred from the control data acquisition section 62.

Next, an explanation is made as to configurations of the output converters T21, T22, T23, . . . using the output converter T21 as an example. Since the configurations of the output converters T22 and T23 are the same as the configuration of the output converter T21, explanations thereof are omitted here.

The control content determination section 70 included in the output converter T21 receives various control data such as the temperature data, the sunlight intensity data, and the power data from the control data acquisition section 62, and determines the control content of the maximum operation point control section 54 in accordance with the received various control data.

For example, in the process of S15 in the flowchart shown in FIG. 4, the maximum operation point control section 54 may determine whether the control content determination section 70 has transmitted an instruction to carry out the DCDC conversion, and when the result of the determination shows that the instruction to carry out the DCDC conversion has been transmitted, the maximum operation point control section 54 may control the DCDC conversion section 53 to carry out the DCDC conversion.

The following specifically explains how the control content determination section 70 determines the control content by using the control data.

[How to Use Temperature Data]

The control content determination section 70 determines the control content of the maximum operation point control section 54 by using the temperature data as follows.

In the output converter T22, a temperature and an output voltage from the module MOD11 which is supposed to be under the temperature has been stored beforehand in a storage section (not shown) in such a manner that the temperature and the output voltage are related to each other.

The control content determination section 70 reads out, from the storage section, an output voltage from the module MOD11 which corresponds to the temperature indicated by the received temperature data, and compares the output voltage thus read out with an output voltage obtained from the module MOD11 in practice.

When the result of the comparison shows that the output voltage obtained from the module MOD11 is smaller than the supposed one, there is a high possibility that the temperature of the module MOD11 is higher than the temperature around the control management device 61 and the output voltage from the module MOD11 drops.

In this case, the control content determination section 70 determines that the DCDC conversion section 53 should carry out the DCDC conversion, and instructs the maximum operation point control section 54 to carry out control in accordance with the determined control content.

[How to Use Sunlight Intensity Data]

The control content determination section 70 determines the control content of the maximum operation point control section 54 by using sunlight intensity data as follows.

In the output converter T21, a reference value of sunlight intensity by which value it is determined that satisfactory sunlight intensity is obtained and an output power from the module MOD11 which is supposed when the satisfactory sunlight intensity is obtained have been stored beforehand.

The control content determination section 70 compares the received sunlight intensity data with the stored reference value of sunlight intensity to judge whether satisfactory sunlight intensity is obtained or not.

When it is judged that the satisfactory sunlight intensity is obtained, it is supposed that there is no shadow around the control management device 61 and the photovoltaic power generation system 2 as a whole receives satisfactory sunlight intensity.

In this case, furthermore, the output power from the module MOD11 which is supposed when satisfactory sunlight intensity is obtained is compared with an output power obtained from the module MOD11 in practice.

When the result of the comparison shows that the output power from the module MOD11 is smaller than the supposed one, it is judged that there is a high possibility that the module MOD11 is shaded and consequently drops the output power.

In this case, the control content determination section 70 determines that the DCDC conversion section 53 should carry out the DCDC conversion, and instructs the maximum operation point control section 54 to carry out control in accordance with the determined control content.

[How to Use Power Data]

The control content determination section 70 determines the control content of the maximum operation point control section 54 by using power data as follows.

The control content determination section 70 calculates, based on the power data, a ratio of the output power from the output converter T21 itself to an output power from the array as a whole.

When the calculated ratio is smaller than a supposed one, the output converter T21 outputs only a small power compared with other output converters T22, T23, . . . .

In this case, the control content determination section 70 determines that the DCDC conversion section 53 should carry out the DCDC conversion, and instructs the maximum operation point control section 54 to carry out control in accordance with the determined control content.

Modification Examples

An explanation was made above as to a configuration in which the control data transmission section 63 transmits various control data to the control content determination section 70, and the control content determination section 70 determines control content for the output converter T21 based on the received various control data.

Alternatively, the present embodiment may be arranged as follows.

That is, the control management device 61 may determine a control content for the output converter T21, and the output converter T21 may carry out control in accordance with the control content determined by the control management device 61.

Specifically, in accordance with the various control data received by the control data acquisition section 62, the control management device 61 may determine a control content for the output converter T21.

Furthermore, control data transmitted from the control data transmission section 63 may be a set of current data and voltage data.

Furthermore, total power data may be calculated with respect to each array, each string, each module, or each cluster.

Furthermore, in the above explanation, the control management device 61 and the power conditioner 60 are provided separately. Alternatively, the power conditioner 60 may include the control management device 61. In a case where the power conditioner 60 includes the control management device 61 therein, wiring for communications and wiring for a power may be shared, so that wiring can be reduced and the circuit configuration can be simplified.

Embodiment 3

The following explains another embodiment of the present invention. In the present embodiment, the photovoltaic power generation system 2 shown in FIG. 9 is arranged such that each module also includes various sensors and a control management device controls output converters in the photovoltaic power generation system based on the result of measurement by a measurement section connected with the modules and the control management device.

(Configuration of Photovoltaic Power Generation System)

Initially, with reference to FIG. 10, an explanation is made below as to a schematic configuration of a photovoltaic power generation system 3 in accordance with the present embodiment. For convenience of explanation, members having the same functions as those in the drawings explained in Embodiments 1 and 2 are given the same reference numerals and explanations thereof are omitted here.

The photovoltaic power generation system 3 includes modules MOD11, MOD12, MOD13, . . . , output converters (voltage setting device) T31, T32, T33, . . . , a power conditioner 60, and a control management device 80.

The modules MOD11, MOD12, MOD13, . . . may belong to the same array/string or may belong to different arrays/strings.

Figure 10:
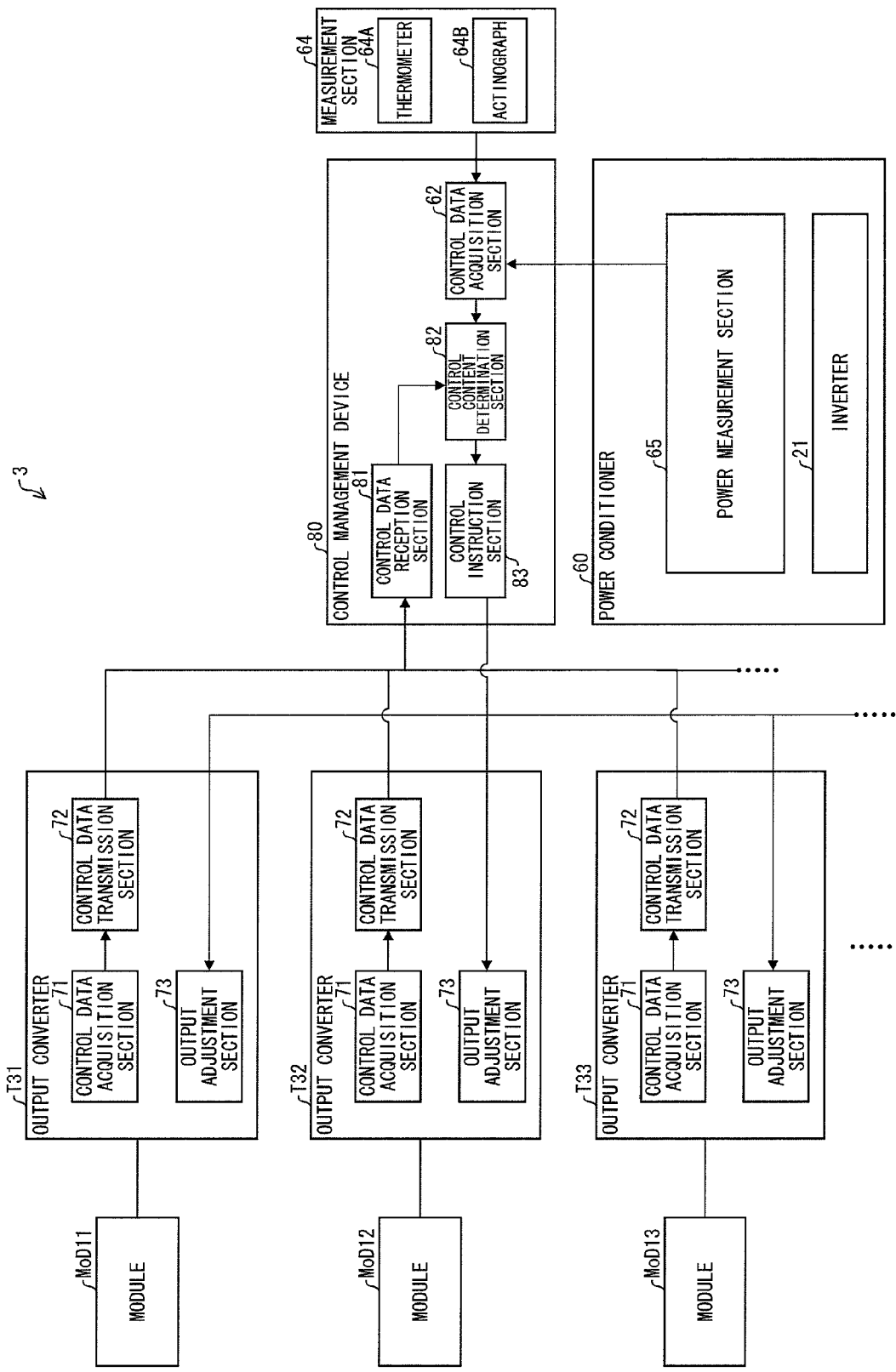
FIG. 10 is a block diagram showing a schematic configuration of a photovoltaic power generation system in accordance with another embodiment of the present invention.

The photovoltaic power generation system 3 shown in FIG. 10 is different from the photovoltaic power generation system 2 shown in FIG. 9 in that the control management device 80 includes a control data reception section (power data reception means) 81, a control content determination section (voltage determination means, bypass determination means, short-circuit determination means) 82, and a control instruction section (control data transmission means) 83 and each of the output converters T31, T32, T33, . . . includes a control data acquisition section (output power detection means, power measurement means) 71, a control data transmission section (transmission means) 72, and an output adjustment section 73.

Furthermore, in the photovoltaic power generation system 3, the control management device 80 is connected with the output converters T31, T32, T33, . . . via a network capable of two-way communications, so that the power conditioner 60 can communicate with the modules MOD11, MOD12, MOD13, . . . . Furthermore, the control management device 80 is connected with the power conditioner 60 via a communication network. In FIG. 10, connections of a power line and loads are not shown.

(Details in Differences)

With reference to FIG. 10, the following explains the control data acquisition section 71, the control data transmission section 72, and the output adjustment section 73 which are included in each of the output converters T31, T32, T33, . . . and the control management device 80.

Initially, an explanation is made below as to the control data acquisition section 71 and the control data transmission section 72 using the output converter T31 as an example. Each of the output converters T31, T32, T33, . . . is connected with a measurement section (not shown) including a thermometer and an actinograph. The measurement section is provided near a corresponding module for example so as to measure a temperature and sunlight intensity near the module.

The control data acquisition section 71 acquires various control data and transfers the acquired data to the control data transmission section 72.

Examples of the data acquired by the control data acquisition section 71 include temperature data and sunlight intensity data which are acquired from the measurement section. Furthermore, the output converter T31 may calculate powers based on voltages and currents which were measured by a primary side voltage/current monitoring section 55 and a secondary side voltage/current monitoring section, and the control data acquisition section 71 may acquire the calculated powers at the primary side and the secondary side as power data.

Other examples of the control data acquired by the control data acquisition section 71 include an input current/input voltage at a primary side S1 and an output current/output voltage at a secondary side S2, an on/off state of a DCDC short-circuit switch 51, an on/off state of a module short-circuit switch 52, a Duty value used in the DCDC conversion.

The control data transmission section 72 controls communications with the control management device 80, and transmits various control data transferred from the control data acquisition section 71 to the control data reception section 81 included in the control management device 80.

The output adjustment section 73 controls communications with the control management device 80. The output adjustment section 73 receives a control content from the control instruction section 83, and controls the output converter T31 in accordance with the received control content. Since the output converter T31 includes the output adjustment section 73, the output converter T31 does not include the maximum operation point control section 54 shown in FIG. 1. Unlike the maximum operation point control section 54, the output adjustment section 73 does not determine a control content. Accordingly, the output converter T31 does not necessarily require a block for determining a control content, so that the circuit configuration can be simplified by just that much.

That is, the control management device 80 may control all of the output converters T31, T32, T33, . . . .

Next, the control management device 80 is explained below.

The control data reception section 81 receives various control data from the control data transmission section 72.

The control content determination section 82 collects various control data acquired by the control data acquisition section 62 and various control data received by the control data reception section 81, and determines, based on the collected various control data, control contents to be carried out by the output converters T31, T32, T33, . . . . The control content determination section 82 transfers the determined control contents to the control instruction section 83.

The control instruction section 83 transmits the control contents from the control content determination section 82 to the output converters T31, T32, T33, . . . connected with the control instruction section 83 via the communication network.

(Detail in Operation of Control Content Determination Section)

Next, a specific explanation is made as to how the control content determination section 82 uses control data to determine a control content.

The control content determination section 82 determines a control content as follows by using control data collected from the control data transmission section 72 included in each of the output converters T31, T32, T33, . . . . The control content determination section 82 collects the control data.

Initially, the control content determination section 82 determines whether there is any module which is supposed to have decreased its output out of modules constituting a string.

For example, when judging that there is a module whose temperature increases extremely compared with other modules based on temperature data, the control content determination section 82 determines a control content such that the module short-circuit switch is to be put in an on-state. The control instruction section 83 instructs the output converter connected with the module to carry out control in accordance with the control content.

Furthermore, the control content determination section 82 determines, based on an output current/output voltage at the secondary side S2 and sunlight intensity, whether there is any module whose output has been decreased.

Furthermore, in a case where the control content determination section 82 determines that it is desirable to carry out the DCDC conversion based on the output deduced from the various control data collected from the output converter T11, the control content determination section 82 determines a control content such that the DCDC control should be carried out.

Furthermore, in a case where the control content determination section 82 determines that it is preferable to put the DCDC short-circuit switch 51 in an on-state based on the output deduced from the various control data collected from the output converter T11, the control content determination section 82 determines a control content such that the DCDC short-circuit switch 51 should be put in an on-state.

The control content determined by the control content determination section 82 is transmitted by the control instruction section 83 to the output converter T11.

Modification Examples

An explanation was made above as to a configuration in which the control content determination section 82 collects various control data acquired by the control data acquisition section 62 and various control data received by the control data reception section 81, and determines, based on the collected various control data, control contents to be carried out by the output converters T31, T32, T33, . . . .

However, the present embodiment is not limited to this. Alternatively, like the control management device 61 explained with reference to FIG. 9, the control management device 80 may acquire and collect control data and transmit the data as it is to the output converters T31, T32, T33, . . . and the output converters T31, T32, T33, . . . determine control contents based on the received control data.

Alternatively, the control management device 80 may be provided with a database in which various control data acquired by the control data acquisition section 62 and various control data received by the control data reception section 81 are stored so that history of the control data collected by the control management device 80 is managed.

For example, by storing an output converter from which collected control data were transmitted, times at which the control data were collected, and the control data in such a manner that they are related to one another, it is possible to grasp patterns of power generation per year, per season, per month, per week, or per time zone with respect to each module.

Accordingly, the control management device 80 can instruct an output converter connected with a module expected to be shaded at a predetermined time zone to put a module short-circuit switch in an on-state. Furthermore, the control management device 80 can instruct an output converter connected with a module expected to obtain sufficient sunlight intensity at a predetermined time zone to put a DCDC short-circuit switch in an on-state.

The invention in accordance with the present embodiment may be expressed as follows.

With respect to the control management device, the voltage setting device is arranged so as to further include a bypass circuit via which the current from the solar battery bypasses the voltage changing circuit to be outputted to outside, and the control management device is arranged so as to further include bypass determination means for determining whether the current from the solar battery is to be outputted to outside via the voltage changing circuit or via the bypass circuit, the control data transmission means transmitting a result of determination by the bypass determination means to the voltage setting device.

The voltage setting device is a voltage setting device which is connected with the control management device via a communication network, which sets a voltage to a current from a solar battery, and which outputs the current at the voltage to outside, including: a voltage changing circuit capable of changing the voltage; output power detection means for detecting a power from the voltage changing circuit; transmission means for transmitting the output power detected by the output power detection means to the control management device; a bypass circuit via which the current from the solar battery bypasses the voltage changing circuit to be outputted to outside; and reception means for receiving the control data transmitted from the control management device.

Furthermore, the invention in accordance with the present embodiment may be expressed as follows.

The voltage setting device includes: transmission means for transmitting, via a communication network, an output power detected by the output power detection means to a control management device which determines a voltage from the voltage setting device so that the output power from the voltage setting device to the control management device is maximum; and reception means for receiving the voltage data transmitted from the control management device, the voltage determination means determining, based on the received voltage data, a voltage to be set by the voltage changing circuit.

The control management device is a control management device connected via a communication network with a voltage setting device which sets a voltage to a current from a solar battery and outputs the current at the voltage to outside, and which includes a voltage changing circuit capable of changing the voltage and output power detection means for detecting a power from the voltage changing circuit, the control management device including: power data reception means for receiving, from the voltage setting device, an output power detected by the output power detection means; voltage determination means for determining the voltage from the voltage setting device so that the output power indicated by power data received by the power data reception means is maximum; and control data transmission means for transmitting the voltage determined by the voltage determination means to the voltage setting device.

With the arrangement, in accordance with control data transmitted from the control management device, the voltage setting device outputs a current to outside via the bypass circuit.

Consequently, the voltage setting circuit can output a current via the bypass circuit if necessary, so that it is possible to prevent a loss in power.

Furthermore, the invention in accordance with the present embodiment may be expressed as follows.

With respect to the control management device, the voltage setting device is arranged so as to further include: power measurement means for measuring, between the solar battery and the voltage changing circuit or the bypass circuit, a power from the solar battery; and a short-circuit switching circuit for switching between a state where two output terminals for outputting a voltage to outside are short-circuited and a state where the two output terminals are not short-circuited, and the control management device is arranged so as to further include short-circuit determination means for controlling a switching operation of the short-circuit switching circuit, when the power measured by the power measurement means meets a predetermined standard, the short-circuit determination means controlling the short-circuit switching circuit so that the short-circuit switching circuit switches to the state where the two output terminals are short-circuited, and the control data transmission means transmitting a result of control by the short-circuit determination means to the voltage setting device.

The voltage setting device of the present invention is a voltage setting device which is connected via a communication network with the control management device, which sets a voltage to a current from a solar battery, and which outputs the current at the voltage to outside, including: a voltage changing circuit capable of changing the voltage; output power detection means for detecting a power from the voltage changing circuit; power measurement means for measuring, between the solar battery and the voltage changing circuit or the bypass circuit, a power from the solar battery; a short-circuit switching circuit for switching between a state where two output terminals for outputting a voltage to outside are short-circuited and a state where the two output terminals are not short-circuited; transmission means for transmitting the power detected by the output power detection means and the power measured by the power measurement means to the control management device; and reception means for receiving the control data transmitted from the control management device.

With the arrangement, in accordance with control data transmitted from the control management device, the voltage setting device causes the short-circuit switching circuit to switch to the state where the two output terminals are short-circuited.

Consequently, in the voltage setting device, a voltage is outputted from one output terminal to the other output terminal via the short-circuited two output terminals if necessary.

Embodiment 4

Figure 11:
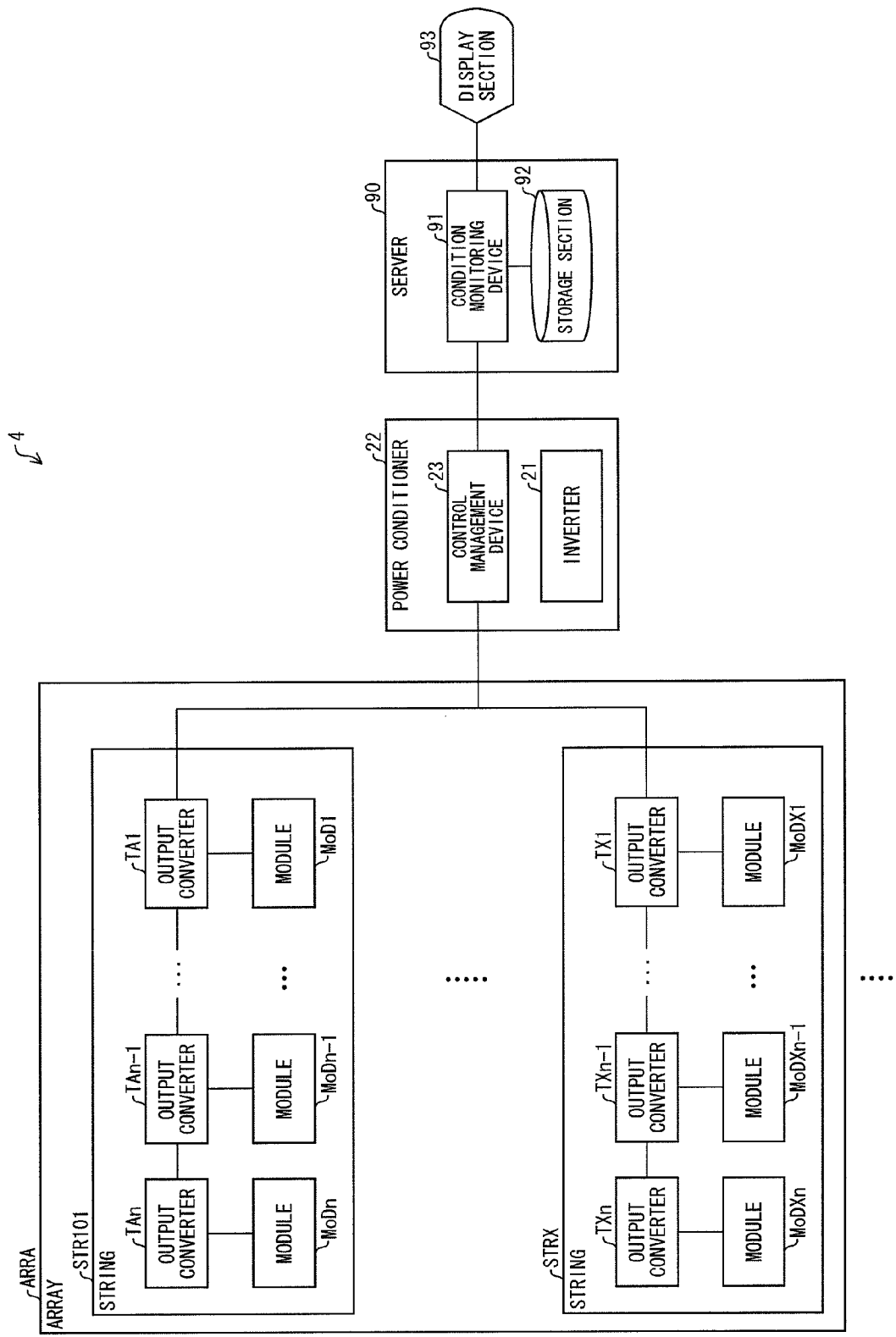
FIG. 11 is a block diagram showing a schematic configuration of a photovoltaic power generation system in accordance with another embodiment of the present invention.
Figure 12:
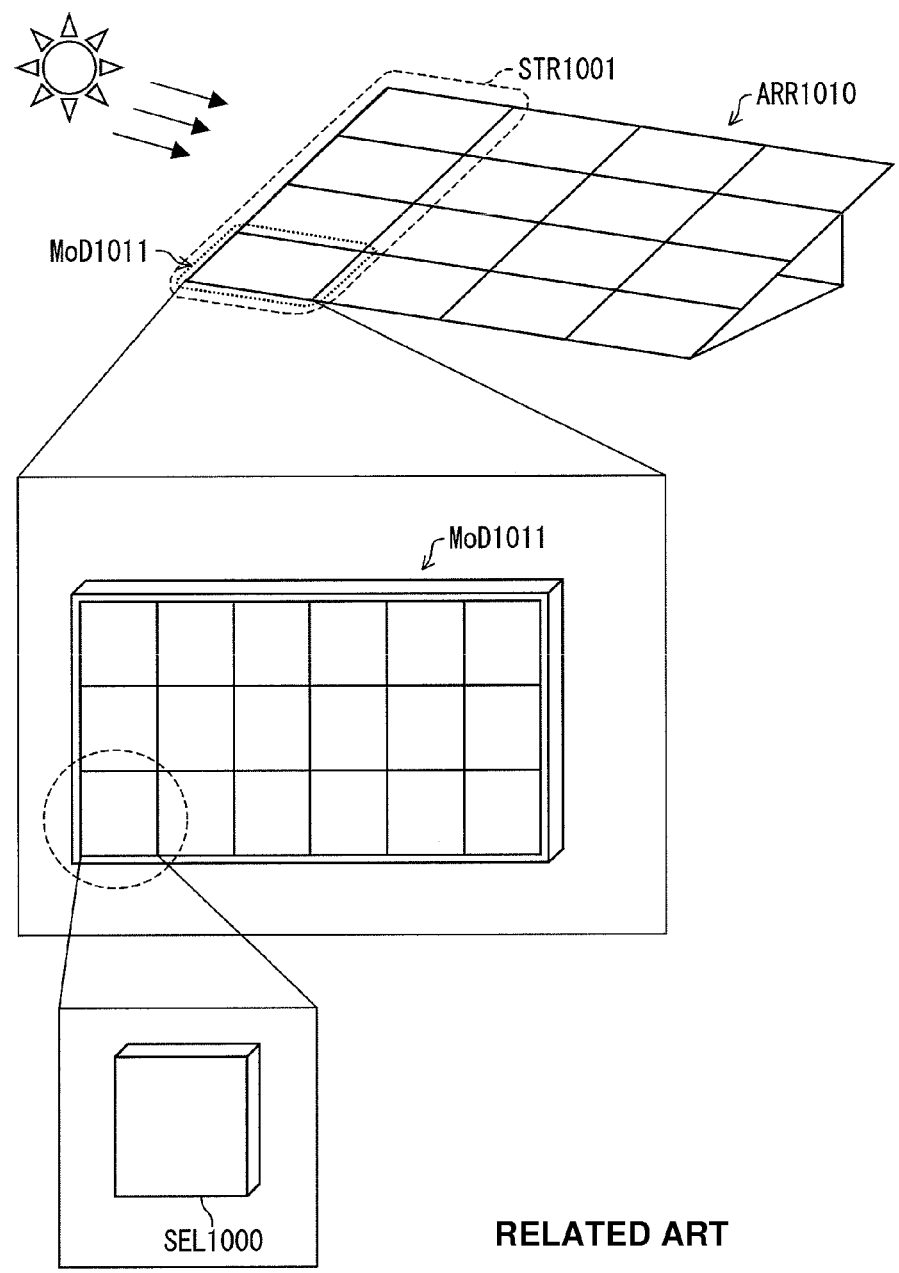
FIG. 12 is a schematic view showing a relationship among a conventional solar battery array, a conventional solar battery string, a conventional solar battery module, and a conventional solar battery cell.
Figure 13:
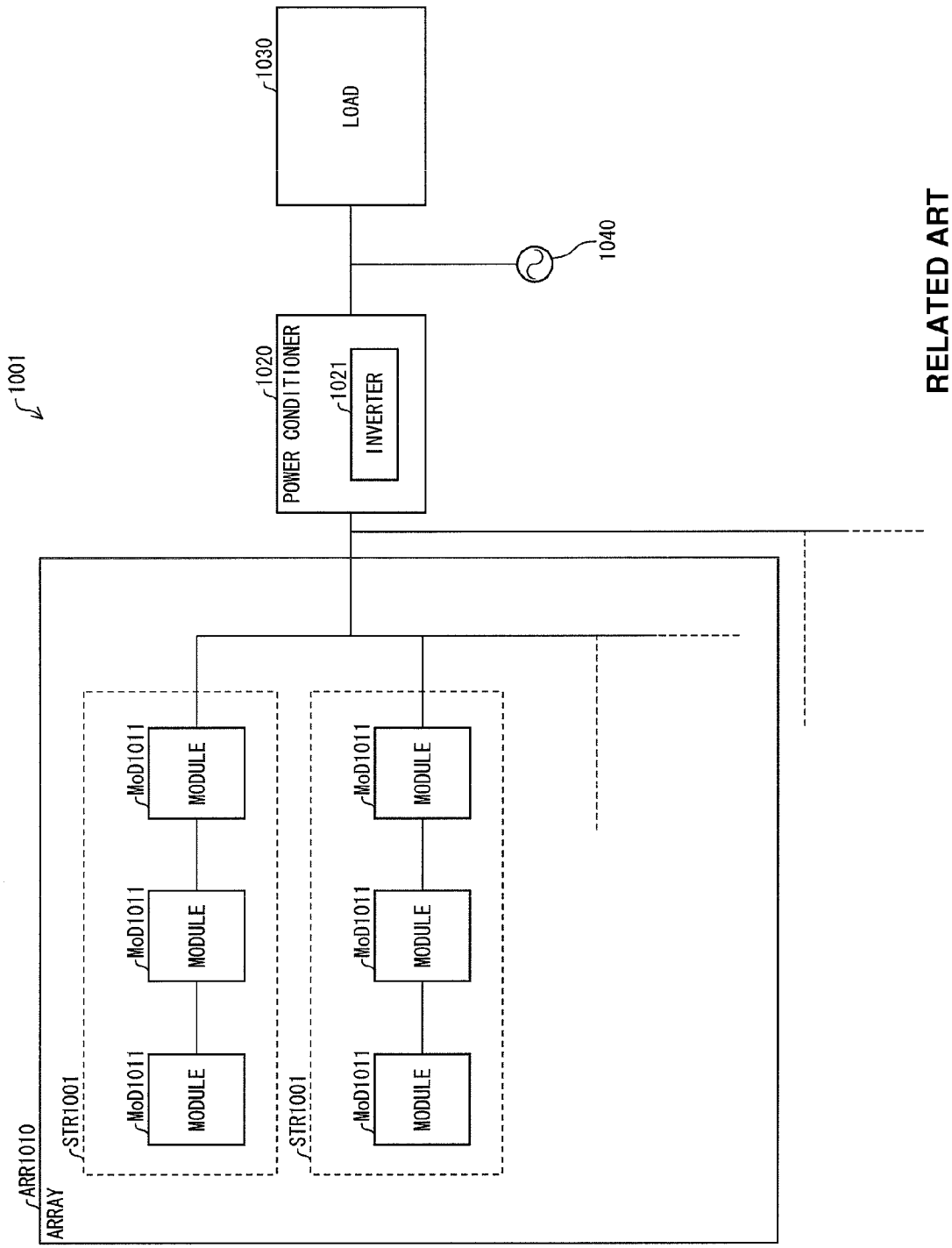
FIG. 13 is a block diagram showing a schematic configuration of a conventional photovoltaic power generation system.

With reference to FIG. 11, the following explains another embodiment of the present invention. In the present embodiment, a photovoltaic power generation system includes a server for monitoring and storing the condition of a power generation line including a power conditioner 22 and an array ARRA so as to analyze patterns of the amount of power generation and to manage conditions of the power generation. (Configuration of Photovoltaic Power Generation System)

With reference to FIG. 11, the following explains a schematic configuration of a photovoltaic power generation system 4 in accordance with the present embodiment. For convenience of explanation, members having the same functions as those in the drawings explained in Embodiments 1 and 2 are given the same reference signs and explanations thereof are omitted.

As shown in FIG. 11, a photovoltaic power generation system 4 includes a plurality of arrays ARRA, the power conditioner 22, a server 90, and a display section 93.

Each of the arrays ARRA includes a plurality of strings STR101 to STRX. The string STR101 includes plural sets of a module and an output converter connected with the module. The output converters TA1 to TAn are connected in series. The same is applied to other strings.

The output converters TA1 to TAn have the same configurations as the output converters T31, T32, T33, ... explained with reference to FIG. 10.

The power conditioner 22 includes a control management device 23 and an inverter 21.

The server 90 includes a condition monitoring device 91 and a storage section 92, and is connected with a display section 93.

The condition monitoring device 91 is connected with the power conditioner 22 via a communication network, and acquires control data from the output converters via the control management device 23 and stores the control data in a storage section 92. The condition monitoring device 91 stores the acquired control data in the storage section 92 in such a manner that the acquired control data is related to a module, string, and an array from which the control data has been acquired and a time zone at which the control data has been acquired.

The condition monitoring device 91 causes the display section 93 to display, in a real time, contents stored in the storage section 92. On the other hand, in response to a request from the display section 93, the condition monitoring device 91 can cause the display section 93 to display contents of previous control data and statistics of control data.

The condition monitoring device 91 may be connected with a plurality of power conditioners 22.

The photovoltaic power generation system 4 as above enables a manager etc. thereof to refer to control data and static data thereof stored in the storage section 92, so that the manager etc. can easily grasp the condition of the photovoltaic power generation system 4 and can confirm patterns of power generation.

SUMMARY

The present invention is preferably applicable to solar battery modules etc. for housing and industrial use. However, the present invention is not limited to such purposes, and is also applicable to solar battery devices of a small size. Since such solar battery devices output small amounts of voltage/current, an output converter of the present invention can be downsized.

The present invention is not limited to the description of the embodiments above, but may be altered by a skilled person within the scope of the claims. An embodiment based on a proper combination of technical means disclosed in different embodiments is encompassed in the technical scope of the present invention.

As described above, the present invention may be expressed as follows. A voltage setting device of the present invention is a voltage setting device for setting a voltage to a current from a solar battery and outputting the current at the voltage to outside, including: a voltage changing circuit capable of changing the voltage; output power detection means for detecting a power from the voltage changing circuit; and voltage determination means for determining what voltage is to be set by the voltage changing circuit so that an output power detected by the output power detection means is maximum.

A method of the present invention for controlling a voltage setting device is a method for controlling a voltage setting device for setting a voltage to a current from a solar battery and outputting the current at the voltage to outside, including the steps of: (i) detecting a power from a voltage changing circuit capable of changing the voltage; and (ii) determining what voltage is to be set by the voltage changing circuit so that an output power detected in the step (i) is maximum.

With the arrangement, it is possible to detect a power from the power changing circuit when a direct current voltage from the solar battery is inputted to the power changing circuit and outputted therefrom. The solar battery may be a cell which is a photovoltaic power generation element, may be a cluster or a module in which a plurality of cells are connected in series, may be a string in which a plurality of modules are connected in series, or may be an array in which a plurality of strings are connected in parallel.

While detecting the power from the voltage changing circuit, there is determined what voltage is to be set by the voltage changing circuit so that the detected power is maximum.

Accordingly, it is possible to subdue a loss when a voltage is set by the voltage changing circuit and a current at the voltage is outputted to outside (so-called DCDC conversion). Consequently, it is possible to obtain the maximum output power from the voltage changing circuit which power could not be obtained only by maximizing the output from the solar battery. In other words, with the arrangement, it is possible to efficiently use solar energy.

It is preferable to arrange the voltage setting device of the present invention so as to further include power measurement means for measuring, between the solar battery and the voltage changing circuit, a power from the solar battery, the voltage determination means determining a temporal voltage which is set by the voltage changing circuit so that the power measured by the power measurement means is maximum, and thereafter the voltage determination means determining, using the temporal voltage as a reference, a voltage which is set by the voltage changing circuit so that the output power detected by the output power detection means is maximum.

With the arrangement, initially, the power from the solar battery is measured between the solar battery and the voltage changing circuit, so that a temporal voltage at which the power is maximum is determined.

Determination of the temporal voltage is made by MPPT control. Accordingly, it is possible to relatively speedily determine the temporal voltage.

Thereafter, using the temporal change as a reference, a voltage is determined so that the output power detected by the output voltage detection means is maximum. Accordingly, determination of the voltage is made more speedily.

It is preferable to arrange the voltage setting device of the present invention so as to further include a bypass circuit via which the current from the solar battery bypasses the voltage changing circuit to be outputted to outside, and bypass determination means for determining whether the current from the solar battery is to be outputted to outside via the voltage changing circuit or via the bypass circuit.

When a voltage is set by the voltage changing circuit to a current from the solar battery and the current at the voltage is outputted to outside, there is a loss in power.

With the arrangement, there is provided the bypass circuit via which the current from the solar battery bypasses the voltage changing circuit to be outputted to outside, and it can be determined whether the current from the solar battery is to be outputted to outside via the voltage changing circuit or via the bypass circuit.

Accordingly, it is possible to output the current to outside via the bypass circuit if necessary.

As described above, by outputting the current to outside via the bypass circuit if necessary, it is possible to prevent a loss in power at the voltage changing circuit.

It is preferable to arrange the voltage setting device of the present invention such that the bypass determination means determines, based on at least one of a temperature of the solar battery or sunlight intensity, whether the current from the solar battery is to be outputted to outside via the voltage changing circuit or via the bypass circuit.

With the arrangement, whether the current from the solar battery is to be outputted to outside via the voltage changing circuit or via the bypass circuit is determined based on at least one of a temperature of the solar battery or sunlight intensity, As described above, when a current is outputted to outside via the voltage changing circuit, there is a loss in power at the voltage changing circuit. Accordingly, when a sufficiently large power is obtained from the solar battery without changing a voltage, it is more preferable to output a current to outside via the bypass circuit in order to prevent the loss in power at the voltage changing circuit.

Characteristics of a solar battery are as follows.

As the temperature of a solar battery increases, a voltage of a generated power decreases due to characteristics of the solar battery. Furthermore, intensity of sunlight incident to the solar battery influences the efficiency in power generation of the solar battery. That is, as the intensity of sunlight increases, the power from the solar battery increases, and as the intensity of sunlight decreases, the power from the solar battery decreases.

That is, the size of a power from a solar battery can be estimated using the temperature of the solar battery and/or intensity of sunlight incident to the solar battery, without directly measuring the size of the power from the solar battery.

Accordingly, a current can be outputted to outside not via the voltage changing circuit but via the bypass circuit if necessary. That is, when the sunlight intensity is high, a current is to be outputted to outside via the bypass circuit, and when the temperature of the solar battery is high, a current is to be outputted to outside via the voltage changing circuit.

Consequently, it is possible to prevent a loss in power caused when a power from the solar battery is likely to be sufficiently large but needlessly flows through the voltage changing circuit.

It is preferable to arrange the voltage setting device of the present invention so as to further include power measurement means for measuring, between the solar battery and the voltage changing circuit or the bypass circuit, a power from the solar battery, the bypass determination means determining, based on the power measured by the power measurement means, whether the current from the solar battery is to be outputted to outside via the voltage changing circuit or via the bypass circuit.

As described above, when a sufficiently large power is being obtained from the solar battery without changing a voltage, it is more preferable to output the current from the solar battery to outside via the bypass circuit in order to prevent a loss in power at the voltage changing circuit.

With the arrangement, initially, the power from the solar battery is measured, so that it is possible to determine whether the current is to be outputted to outside via the voltage changing circuit or via the bypass circuit based on the measured power.

Accordingly, it can be determined whether the current is to be outputted via the voltage changing circuit or the bypass circuit depending on whether a sufficiently large power is obtained from the solar battery or not.

Consequently, it is possible to prevent a loss in power caused when a sufficiently large power is being obtained from the solar battery but needlessly flows the voltage changing circuit.

It is preferable to arrange the voltage setting device of the present invention so as to further include power measurement means for measuring, between the solar battery and the voltage changing circuit or the bypass circuit, a power from the solar battery, a short-circuit switching circuit for switching between a state where two output terminals for outputting a voltage to outside are short-circuited and a state where the two output terminals are not short-circuited, and short-circuit determination means for determining whether the short-circuit switching circuit switches to the state where the two output terminals are short-circuited, when the power measured by the power measurement means is not more than a predetermined value, the short-circuit determination means switching the short-circuit switching circuit to the state where the two output terminals are short-circuited.

In a case where voltage setting devices connected with solar batteries are connected in series with each other, decrease in output power of one solar battery may greatly decrease output power of other solar battery.

With the arrangement, a power from the solar battery is measured and the state of the short-circuit switching circuit is changed based on the measured power. Accordingly, when the output of the solar battery decreases, it is possible to bypass the solar battery in the circuit configuration so that a current from one voltage setting device of the voltage setting devices connected in series is directly outputted to the other voltage setting device. Consequently, it is possible to eliminate, from the circuit configuration, the solar battery that may have an adverse influence on the power from other solar batteries as a whole.

Accordingly, it is possible to prevent the solar battery with decreased output from having an adverse influence on the power from other solar batteries as a whole.

Furthermore, a current flowing in a short-circuit condition flows in a single direction due to a backflow preventing function. Accordingly, a backflow prevention element normally included in a connection box is unnecessary.

It is preferable to arrange the voltage setting device of the present invention so as to further include reception means for receiving, via a communication network, array output power data indicative of an output power from the solar battery array, the bypass determination means determining, based on the array output power data, whether the current is to be outputted to outside via the voltage changing circuit or via the bypass circuit.

With the arrangement, the array output power data indicative of an output power from the solar battery array including solar batteries is received, and based on the output power from the solar battery array which is indicated by the received array output power data, it can be determined whether a current is to be outputted to outside via the bypass circuit or not.

As described above, by outputting a current to outside via the bypass circuit if necessary, it is possible to prevent a loss in power at the voltage changing circuit.

It is preferable to arrange the voltage setting device of the present invention so as to further include reception means for receiving, via a communication network, array output power data indicative of a power from a solar battery array, the short-circuit determination means judging whether the power measured by the power measurement means meets a predetermined standard, based on a ratio of the power measured by the power measurement means to the power indicated by the array output power data.

With the arrangement, short-circuit is controlled based on the ratio of a power from a solar battery to a power from a solar battery array including the solar battery. Since short-circuit is controlled based on the ratio of a power from a solar battery to a power from a solar battery array as a whole, it is possible to switch the short-circuit switching circuit to a short-circuited state when, for example, the output from the solar battery extremely drops in the solar battery array as a whole.

It is preferable to arrange the voltage setting device of the present invention so as to further include transmission means for transmitting power data indicative of the output power detected by the output power detection means.

A control management device of the present invention includes power data reception means for receiving power data, voltage determination means for determining a voltage so that an output power indicated by the power data received by the power data reception means is maximum, and control data transmission means for transmitting the voltage determined by the voltage determination means.

With the arrangement, based on power data transmitted from the voltage setting device, the control management device can determine a voltage so that a power from the voltage setting device to outside is maximum. Accordingly, the voltage setting device can maximize the power from the voltage changing circuit in accordance with the voltage determined by the control management device. In other words, the arrangement allows efficient use of solar energy.

An appropriate combination of the voltage setting device of the present invention and the control management device of the present invention realizes a photovoltaic power generation system including the voltage setting device and the control management device. The photovoltaic power generation system is also encompassed in the scope of the present invention.

Lastly, a part of or all of each block of the output converter T11 etc. may be realized by hardware logic or by software by using CPUs as described below.

Namely, the output converter T11 etc. include: CPUs (central processing unit) for executing a program for realizing functions of each block; ROMs (read only memory) that store the program; RAMs (random access memory) that develop the program; storage devices (storage mediums) such as memory that store the program and various data; and the like. The object of the present invention can be realized in such a manner that the output converter T11 etc. are provided with a computer-readable storage medium for storing program codes (such as executable program, intermediate code program, and source program) of control programs of output converter T11 etc. which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a Floppy Disc® and a hard disc), and optical discs (e.g. CD-ROM, MO, MD, DVD, CD-R, and Blue-Ray Disc®). Further, the storage medium may be cards such as an IC card (including a memory card) and an optical card, or semiconductor memories such as mask ROM, EPROM, EEPROM, and flash ROM.

Furthermore, the output converter T11 etc. may be arranged so as to be connectable to a communication network so that the program code is supplied to the output converter T11 etc. through the communication network. The communication network is not particularly limited. Examples of the communication network include the Internet, intranet, extranet, LAN, ISDN, VAN, CATV communication network, virtual private network, telephone network, mobile communication network, and satellite communication network. Furthermore, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR, mobile phone network, satellite connections, and terrestrial digital network. Note that the present invention can be also realized by the program codes in the form of a computer data signal embedded in a carrier wave, which is the program that is electrically transmitted.

INDUSTRIAL APPLICABILITY

The present invention is widely and preferably applicable to a photovoltaic power generation system regardless of the size of the photovoltaic power generation system.

REFERENCE SIGNS LIST 1, 2, 3, 4. Photovoltaic power generation system
30. Load
51. DCDC short-circuit switch (bypass circuit)
52. Module short-circuit switch (short-circuit switching circuit)
53. DCDC conversion section (voltage changing circuit)
54. Maximum operation point control section (voltage determination means, bypass determination means, short-circuit determination means)
55. Primary side voltage/current monitoring section (power measurement means)
56. Secondary side voltage/current monitoring section (output power detection means)
60. Power conditioner
61. Control management device
62. Control data acquisition section
63. Control data transmission section
70. Control content determination section (voltage determination means, bypass determination means, short-circuit determination means, reception means)
71. Control data acquisition section (output power detection means, power measurement means)
72. Control data transmission section (transmission means)
73. Output adjustment section (reception means)
80. Control management device
81. Control data reception section (voltage data reception means)
82. Control content determination section (voltage determination means, bypass determination means, short-circuit determination means)
83. Control instruction section (control data transmission means)
ARR11. Array
CLS11-CLS13. Cluster (solar battery)
MOD11-MOD13. Module (solar battery)
MOD21. Module
STR11. String
T11-T13. Output converter (voltage setting device)
T21, T22, T23 .... Output converter (voltage setting device)
T31, T32, T33 .... Output converter (voltage setting device)
S2+. Secondary side cathode (cathode output terminal)
S2−. Secondary side anode (anode output terminal)

The invention claimed is:

1. A voltage setting device for setting a voltage to a current from a solar battery and outputting the current at the voltage to outside, comprising:
a voltage changing circuit capable of changing the voltage;
output power detection means for detecting a power from the voltage changing circuit;
voltage determination means for determining what voltage is to be set by the voltage changing circuit so that an output power detected by the output power detection means is maximum;
a bypass circuit via which the current from the solar battery bypasses the voltage changing circuit to be outputted to outside;
bypass determination means for determining whether the current from the solar battery is to be outputted to outside via the voltage changing circuit or via the bypass circuit;
power measurement means for measuring a power from the solar battery;
a short-circuit switching circuit for switching between a state where a cathode output terminal for outputting a voltage to outside and an anode output terminal are short-circuited and a state where the cathode output terminal and the anode output terminal are not short-circuited; and
short-circuit determination means for, when the power measured by the power measurement means is not more than a predetermined value, switching the short-circuit switching circuit to the state where the cathode output terminal and the anode output terminal are short-circuited.

2. The voltage setting device as set forth in claim 1, wherein the bypass determination means determines, based on at least one of a temperature of the solar battery or sunlight intensity, whether the current from the solar battery is to be outputted to outside via the voltage changing circuit or via the bypass circuit.

3. The voltage setting device as set forth in claim 1, wherein the bypass determination means determines, based on the power measured by the power measurement means, whether the current from the solar battery is to be outputted to outside via the voltage changing circuit or via the bypass circuit.

4. The voltage setting device as set forth in claim 1, further comprising reception means for receiving, via a communication network, array output power data indicative of a power from a solar battery array,
the short-circuit determination means judging whether the power measured by the power measurement means meets a predetermined standard, based on a ratio of the power measured by the power measurement means to the power indicated by the array output power data.

5. The voltage setting device as set forth in claim 1, wherein the voltage determination means determines a temporal voltage which is set by the voltage changing circuit so that the power measured by the power measurement means is maximum, and thereafter the voltage determination means determines, using the temporal voltage as a reference, a voltage which is set by the voltage changing circuit so that the output power detected by the output power detection means is maximum.

6. The voltage setting device as set forth in claim 1, further comprising transmission means for transmitting power data indicative of the output power detected by the output power detection means.

7. A photovoltaic power generation system, comprising: a voltage setting device as set forth in claim 6; and a control management device capable of receiving power data from the voltage setting device, the control management device including:

voltage determination means for determining a voltage so that an output power indicated by the power data received from the voltage setting device is maximum; and control data transmission means for transmitting the voltage determined by the voltage determination means to the voltage setting device.

8. A photovoltaic power generation system, comprising:

a solar battery array; and a voltage setting device as set forth in claim 1, connected with the solar battery array.

9. A method for controlling a voltage setting device for setting a voltage to a current from a solar battery and outputting the current at the voltage to outside, comprising the steps of:

(i) detecting a power from a voltage changing circuit capable of changing the voltage;

(ii) determining what voltage is to be set by the voltage changing circuit so that an output power detected in the step (i) is maximum;

(iii) determining whether the current from the solar battery is to be outputted to outside via the voltage changing circuit or via a bypass circuit via which the current from the solar battery bypasses the voltage changing circuit to be outputted to outside;

(iv) measuring a power from the solar battery; and (v) when the power measured in the step (iv) is not more than a predetermined value, switching a short-circuit switching circuit from a state where a cathode output terminal for outputting a voltage to outside and an anode output terminal are not short-circuited to a state where the cathode output terminal and the anode output terminal are short-circuited.

10. A voltage setting device which is connected with one of a plurality of solar batteries included in a solar battery array, which sets a voltage to a current from said one solar battery, and which outputs the current at the voltage to outside, the voltage setting device being communicably connected with a control management device for generating array output power data indicative of a sum of powers outputted from the plurality of solar batteries included in the solar battery array, the voltage setting device comprising:

a voltage changing circuit capable of changing the voltage;

output power detection means for detecting a power from the voltage changing circuit;

voltage determination means for determining what voltage is to be set by the voltage changing circuit so that an output power detected by the output power detection means is maximum;

reception means for receiving the array output power data from the control management device;

a bypass circuit via which the current from said one solar battery bypasses the voltage changing circuit to be outputted to outside;

bypass determination means for determining that the current from said one solar battery is to be outputted to outside via the voltage changing circuit when a ratio of a power from said one solar battery which is detected by the output power detection means to an output power indicated by the array output power data received by the reception means is not more than a predetermined value, and determining that the current from said one solar battery is to be outputted to outside via the bypass circuit when the ratio is more than the predetermined value.

11. The voltage setting device as set forth in claim 10, further comprising power measurement means for measuring, between said one solar battery and the voltage changing circuit, a power from said one solar battery, the voltage determination means determining a temporal voltage which is set by the voltage changing circuit so that the power measured by the power measurement means is maximum, and thereafter the voltage determination means determining, using the temporal voltage as a reference, a voltage which is set by the voltage changing circuit so that the output power detected by the output power detection means is maximum.

12. The voltage setting device as set forth in claim 10, further comprising transmission means for transmitting power data indicative of the output power detected by the output power detection means to the control management device.

13. A photovoltaic power generation system, comprising: a solar battery array including a plurality of solar batteries; a plurality of voltage setting devices as set forth in claim 12, connected with the plurality of solar batteries, respectively; and the control management device, the control management device including:

power data reception means for receiving power data from the plurality of voltage setting devices; and control data transmission means for collecting the power data received from the plurality of voltage setting devices to generate the array output power data and then transmitting the array output power data to the plurality of voltage setting devices.

14. A photovoltaic power generation system, comprising:

a solar battery array including a plurality of solar batteries;

a plurality of voltage setting devices as set forth in claim 10, connected with the plurality of solar batteries, respectively; and the control management device.

15. A method for controlling a voltage setting device which is connected with one of a plurality of solar batteries included in a solar battery array, which sets a voltage to a current from said one solar battery, and which outputs the current at the voltage to outside, comprising the steps of:

(i) detecting a power from a voltage changing circuit capable of changing the voltage;

(ii) determining what voltage is to be set by the voltage changing circuit so that an output power detected in the step (i) is maximum;

(iii) receiving array output power data from a control management device for generating the array output power data via a communication network, the array output power data being indicative of a sum of powers outputted from the plurality of solar batteries included in the solar battery array; and (iv) when a ratio of a power from said one solar battery which is detected in the step (i) to an output power indicated by the array output power data received in the step (iii) is not more than a predetermined value, determining that the current from said one solar battery is to be outputted to outside via the voltage changing circuit, and when the ratio is more than the predetermined value, determining that the current from said one solar battery is to be outputted to outside via a bypass circuit via which the current from said one solar battery bypasses the voltage changing circuit to be outputted to outside.

* * * * *